(12) United States Patent
Cotichini et al.

(10) Patent No.: US 6,269,392 B1
(45) Date of Patent: *Jul. 31, 2001

(54) METHOD AND APPARATUS TO MONITOR AND LOCATE AN ELECTRONIC DEVICE USING A SECURED INTELLIGENT AGENT

(76) Inventors: Christian Cotichini, 1188 Richards St. PH#6, Vancouver BC (CA), V6H 3B6; Fraser Cain, 3727-B, St. George St., Vancouver BC (CA); David G. Ashworth, 3810 Regent Avenue, North Vancouver British Columbia (CA), V7N 2C4; Peter Michael Bruce Livingston, 19318 118 B Avenue, Pitt Meadows British Columbia (CA), V3Y 2P7; Gabor Solymar, 35 Whalings Circle, Stittsville Ontario (CA), K2S 1S4; Philip B. Gardner, 1955 W. 33rd Ave. #109, Vancouver BC (CA), V6J 4A5; Timothy S. Woinoski, #206-2978 Burlington Dr., Coquitlam BC (CA), V3B 7N4

( * ) Notice: Subject to any disclaimer, the term of this patent is extended or adjusted under 35 U.S.C. 154(b) by 0 days.

This patent is subject to a terminal disclaimer.

(21) Appl. No.: 08/871,221

(22) Filed: Jun. 9, 1997

Related U.S. Application Data

(63) Continuation-in-part of application No. 08/799,401, filed on Feb. 11, 1997, now Pat. No. 5,802,280, and a continuation-in-part of application No. 08/826,098, filed on Mar. 24, 1997, which is a continuation-in-part of application No. 08/558,432, filed on Nov. 15, 1995, now Pat. No. 5,764,892, which is a continuation-in-part of application No. 08/339,978, filed on Nov. 15, 1994.

(51) Int. Cl.[7] .................................................. G06F 3/00
(52) U.S. Cl. .......................................... 709/200; 709/229
(58) Field of Search .................................. 709/214, 202, 709/229, 200; 340/905

(56) References Cited

U.S. PATENT DOCUMENTS

| | | | |
|---|---|---|---|
| 3,925,763 | 12/1975 | Wadhwani . | |
| 4,818,998 | * 4/1989 | Apsell et al. | ......................... 342/444 |
| 4,819,053 | * 4/1989 | Halavais | .............................. 342/353 |
| 4,908,629 | * 3/1990 | Aspell et al. | ........................ 342/457 |

(List continued on next page.)

FOREIGN PATENT DOCUMENTS

| | | |
|---|---|---|
| 0588519 | 8/1993 | (EP) . |
| 0 588 519 | 3/1994 | (EP) . |
| 96/03728 | 2/1996 | (WO) . |
| 96/15485 | 5/1996 | (WO) . |

Primary Examiner—Robert B. Harrell
Assistant Examiner—Thong Vu
(74) Attorney, Agent, or Firm—Liu & Liu LLP

(57) ABSTRACT

A system for locating and monitoring electronic devices utilizing a security system that is secretly and transparently embedded within the software, firmware, or hardware of the electronic device. The security system may be embodied in internal memory devices such as ROM BIOS, ROM, Flash ROM, EPROM, EEPROM, electronic components such as modem, CPU, or hardwired circuits or integrated circuits of a computer. This security system initiates the computer to periodically and conditionally call a host system to provide unique identifying indicia and location information. In one embodiment, the security system calls the host through a public switched telephone network (PSTN) and transmits the indicia in encoded form. In an alternative embodiment, which may be incorporated concurrently with the PSTN application, the security system calls the host system through the Internet and provides the host with indicia encoded within the DNS query sent. The host system is able to identify the calling computer from the indicia and is able to physically locate the computer through either caller identification or by referencing the Internet links which were used to connect the calling computer with the host system.

47 Claims, 24 Drawing Sheets

U.S. PATENT DOCUMENTS

| | | | |
|---|---|---|---|
| 4,999,621 | * | 3/1991 | Loeb . |
| 5,077,788 | | 12/1991 | Cook et al. . |
| 5,218,367 | | 6/1993 | Sheffer et al. . |
| 5,511,109 | | 4/1996 | Hartley et al. . |
| 5,566,339 | | 10/1996 | Perholtz . |
| 5,576,716 | * | 11/1996 | Sadler ................................. 342/357 |
| 5,602,739 | * | 2/1997 | Haagenstad et al. ................ 701/117 |
| 5,635,924 | * | 6/1997 | Tran et al. ........................... 340/905 |
| 5,655,081 | * | 8/1997 | Bonnell et al. ...................... 709/202 |
| 5,708,417 | * | 1/1998 | Tallman et al. ...................... 340/539 |
| 5,715,174 | * | 2/1998 | Cotichini et al. .................... 709/229 |
| 5,748,084 | * | 5/1998 | Isikoff ............................... 340/568.1 |
| 5,771,484 | * | 6/1998 | Tognazzini ........................... 701/117 |
| 5,778,367 | * | 7/1998 | Wesinger, Jr. et al. ................ 707/10 |
| 5,783,989 | * | 7/1998 | Issa et al. ............................. 340/426 |
| 5,802,280 | * | 9/1998 | Cotichini et al. .................... 709/200 |
| 5,818,335 | * | 10/1998 | Rinsch et al. ........................ 340/539 |
| 5,826,025 | * | 10/1998 | Gramlich ........................ 395/200.47 |
| 5,835,087 | * | 11/1998 | Herz et al. ........................... 345/327 |
| 5,835,896 | * | 11/1998 | Fisher et al. ........................... 705/37 |
| 5,838,916 | * | 11/1998 | Domenikos et al. ........... 395/200.49 |
| 5,848,373 | * | 12/1998 | DeLorme et al. ................... 701/200 |
| 5,848,413 | * | 12/1998 | Wolff ..................................... 707/10 |
| 5,877,969 | * | 3/1999 | Gerber ................................. 364/562 |

\* cited by examiner

METHOD AND APPARATUS TO MONITOR AND LOCATE AN ELECTRONIC DEVICE USING A SECURED INTELLIGENT AGENT

This application is a continuation-in-part of U.S. application Ser. No. 08/558,432 filed on Nov. 15, 1995 now U.S. Pat. No. 5,764,892 which is a continuation-in-part application based on co-pending U.S. application Ser. No. 08/339,978 filed on Nov. 15, 1994; a continuation-in-part of U.S. application Ser. No. 08/799,401 filed on Feb. 11, 1997 now U.S. Pat. No. 5,802,280 which is a continuation application based on co-pending U.S. application Ser. No. 08/339,978; a continuation-in-part application of co-pending U.S. application Ser. No. 08/826,098 filed on Mar. 24, 1997 which is a continuation-in-part application of application Ser. No. 08/558,432 now U.S. Pat. No. 5,764,892.

BACKGROUND OF THE INVENTION

Many electronic devices, such as laptop computers and cellular telephones, are becoming more compact and portable. While such portability is extremely convenient for the user, it has given rise to an increased risk of theft. These electronic devices are often very expensive and are easily lost or stolen.

Previously, attempts have been made to provide means for retrieving lost or stolen items of various types. The simplest approach is marking the item with the name and the address of the owner, or some other identification such as a driver's license number. If the item falls into the hands of an honest person, then the owner can be located. However, this approach may not deter a thief who can remove visible markings on the device.

Password protection schemes are of dubious value in discouraging theft or retrieving an item. Although the data can be protected from theft, the computer hardware cannot be found or retrieved. Another approach has been to place a radio transmitter on the item. This has been done in the context of automobile anti-theft devices. The police or a commercial organization monitors the applicable radio frequency to try to locate a stolen vehicle. This method is not suitable for smaller items such as cellular telephones or laptop computers. First, it is inconvenient to disassemble such devices in order to attempt to install a transmitter therein. Second, there may not be any convenient space available to affix such a transmitter. Furthermore, a rather elaborate monitoring service, including directional antennas or the like, is required to trace the source of radio transmissions.

It is therefore an object of the invention to provide an improved means for tracing or locating smaller lost or stolen objects, particularly laptop computers, cellular telephones, desktop computers and other small, portable electronic devices or expensive home and office electronic equipment.

It is a further object of the invention to provide an improved means for locating lost or stolen items, this means being hidden from unauthorized users in order to reduce the risk of such means being disabled by the unauthorized user.

It is a still further object of the invention to provide an improved means for locating lost or stolen items which actively resist attempts to disable the means by an unauthorized user.

It is a still further object of the invention to provide an improved means for inexpensively and reliably locating lost or stolen items.

This invention also advantageously does not interfere with the operating system or running applications. This is accomplished by disposing the means for initiating communication with a host system in the firmware such as on the ROM BIOS or the modem component of a client electronic device. This security system operates independently of the operating system running on the electronic device.

In addition, a feature whereby the security system transmits through the Internet is disclosed. This feature enables the security system to initiate a call to the host monitoring system even when the client is simultaneously running a different Internet application. This system is also disclosed in co-pending parent application Ser. No. 08/826,098 which is hereby incorporated by reference. This represents an advantage over the system disclosed in co-pending parent application Ser. No. 08/558,432, which is hereby incorporated by reference, which could not transmit while an application was using the modem since interference could alert the user to the presence of the security system.

SUMMARY OF THE INVENTION

This invention relates to a security apparatus and method for retrieving lost or stolen electronic devices such as portable computers, PCs (including stolen components such as CPU, hard drives, etc.), cablevision devices, personal digital assistants (PDAs), cellular telephones, etc. This invention enables electronic devices to be surveyed or monitored by implanting thereon an intelligent Agent with a pre-defined task set. This Agent communicates with a pre-selected host monitoring system which is capable of multiple services including; tracing location, providing identifying indicia such as an electronic serial number (ESN), and electronically notifying the end user/owner of its location. The Agent hides within the software/firmware/hardware of the electronic device, and operates without interfering with the regular operation of the device. According to one embodiment of the invention, the Agent is disposed on the ROM BIOS of the electronic device and the Agent takes control of the electronic device and its facilities during its boot-up. According to another embodiment of the invention, the Agent is disposed on the modem component of the electronic device and the Agent operates independently of the electronic device. Another embodiment of the Agent is on the processing unit (e.g., microprocessor) of the electronic device. Yet another embodiment of the Agent is a hardware implementation, such as hard wired circuitry or a single integrated circuit. The Agent is further designed to evade detection and resist attempts to disable it by an unauthorized user.

The invention provides a novel security device for small computers, cellular telephones and the like which can be programmed as firmware onto the non-volatile memory (such as ROM BIOS, ROM, Flash ROM, EPROM, EEPROM or the like) of such devices. Accordingly, no physical alteration is necessary or apparent to a thief. The existence of the security device is well cloaked and thus it cannot be readily located or disabled even if the possibility of its existence is suspected. Apparatuses and methods according to the invention can be very cost effective, requiring relatively inexpensive modifications to software or hardware and operation of relatively few monitoring devices.

According to one aspect of the invention there is provided an electronic device with an integral security system. The security system includes means for sending signals to a remote station at spaced apart intervals of time. The signals include identifying indicia for the electronic device. The means for sending signals includes a telecommunications interface connectable to a telecommunications system, and means for dialing a preselected telecommunications number. In an alternative embodiment, signals are sent through a global network interface. This can be accomplished via the standard public telecommunications system which may be linked to a global network service provider, or through a private network (LAN) link to the global network. The remote station includes a telecommunications receiver having the preselected telecommunications number. The remote station and the electronic device may also simultaneously be connected through the global network.

In one embodiment of the invention the electronic device is a computer, and the means for sending signals includes means for providing signals to the telecommunication interface to dial a preselected telecommunication number and send the identifying indicia. The telecommunication interface may be a modem. The means for providing signals may include security algorithm installed as a firmware onto the non-volatile memory (such as ROM BIOS, ROM, Flash ROM, EPROM, EEPROM, or the like) of the computer, a software program, a micro-code program, a digital signal processor ("DSP") program or a built-in function of the operating system.

The security system may be recorded on the boot sector of a hard disk, on a hidden system file such as IO.SYS, MSDOS.SYS, IBMBIO.COM or IBMDOS.COM, or alternatively on the ROM BIOS of the computer, or a combination of both. The security system functions without interfering with the operating system or any running applications. The security system is loaded into memory whenever the electronic device is powered on or reset. It is loaded before the operating system. Alternatively, the security system may be recorded on the Flash ROM of the modem component of the electronic device. The security system functions independently of the main processor of the electronic device. Consequently, the security system as provided in either the ROM BIOS or the modem Flash ROM is operating system independent.

The Agent may be implemented in the firmware or software of any electronic device, such as a computer. Alternatively, the Agent may be implemented in any component of a computer, as with an electronic component such as the DSP in a modem or the CPU in the computer. Furthermore, the functionality of the Agent may be implemented in the circuitry of any hardware device capable of establishing a communication link through sending and receiving packets of data.

There is provided according to another aspect of the invention a method for tracing lost or stolen electronic devices whereby a telecommunications interface is connectable to a telecommunications system at a first telecommunications station. The method includes providing the electronic device with means for sending signals to the telecommunications interface. The means is instructed by the Agent to send first signals to the telecommunications interface which then calls a remote telecommunications station. These first signals contain the encoded identification (serial number) of the sending computer. Upon detecting an incoming signal, the remote computer determines the identification of the sending computer by decoding its serial number, and can retrieve the caller phone number from the telephone company. The remote computer compares the serial number with a predefined listing of serial numbers of reported lost or stolen computers. The call will only be answered if the sending computer is on the predefined list. In an alternative embodiment, this call filtering feature can be removed and the remote computer will answer all incoming calls.

In an alternative embodiment, if the remote computer answers the incoming call then the means for sending signals automatically sends second signals to the telecommunications interface. The telecommunications interface then transmits identifying indicia for the device as well as any other pertinent information to the remote telecommunications station.

There is provided according to another aspect of the invention a method for tracing lost or stolen electronic articles through a global network such as the Internet. The client computer sends DNS queries which contain encoded identification information to a remote station through the Internet. The remote station receives the queries and decodes the encoded identification information in order to determine if the client computer matches an entry on a list of reported lost or stolen computers. If so, the host sends a predefined response to the client computer indicating that it should initiate a traceroute to provide the host with the Internet communication links connecting the client computer to the host. Additionally, when the client computer receives this predefined response from the host it immediately attempts to contact the host via the telecommunications system.

BRIEF DESCRIPTION OF THE DRAWINGS

These and other objects and advantages will become apparent by reference to the following detailed description and accompanying drawings, in which:

FIGS. 3-1 and 3-2 are an illustrative embodiment in the form of a flowchart of the process by which the operating system and Agent are able to start up and run simultaneously.

FIGS. 4A-1 and 4A-2 are an illustrative embodiment in the form of a flowchart showing the Agent's work cycle according to an embodiment of the invention.

FIG. 11C is an illustration of a manner in which the client identification is encoded within the host name according to one aspect of the invention.

DESCRIPTION OF THE PREFERRED EMBODIMENTS

System Overview

Figure 1:
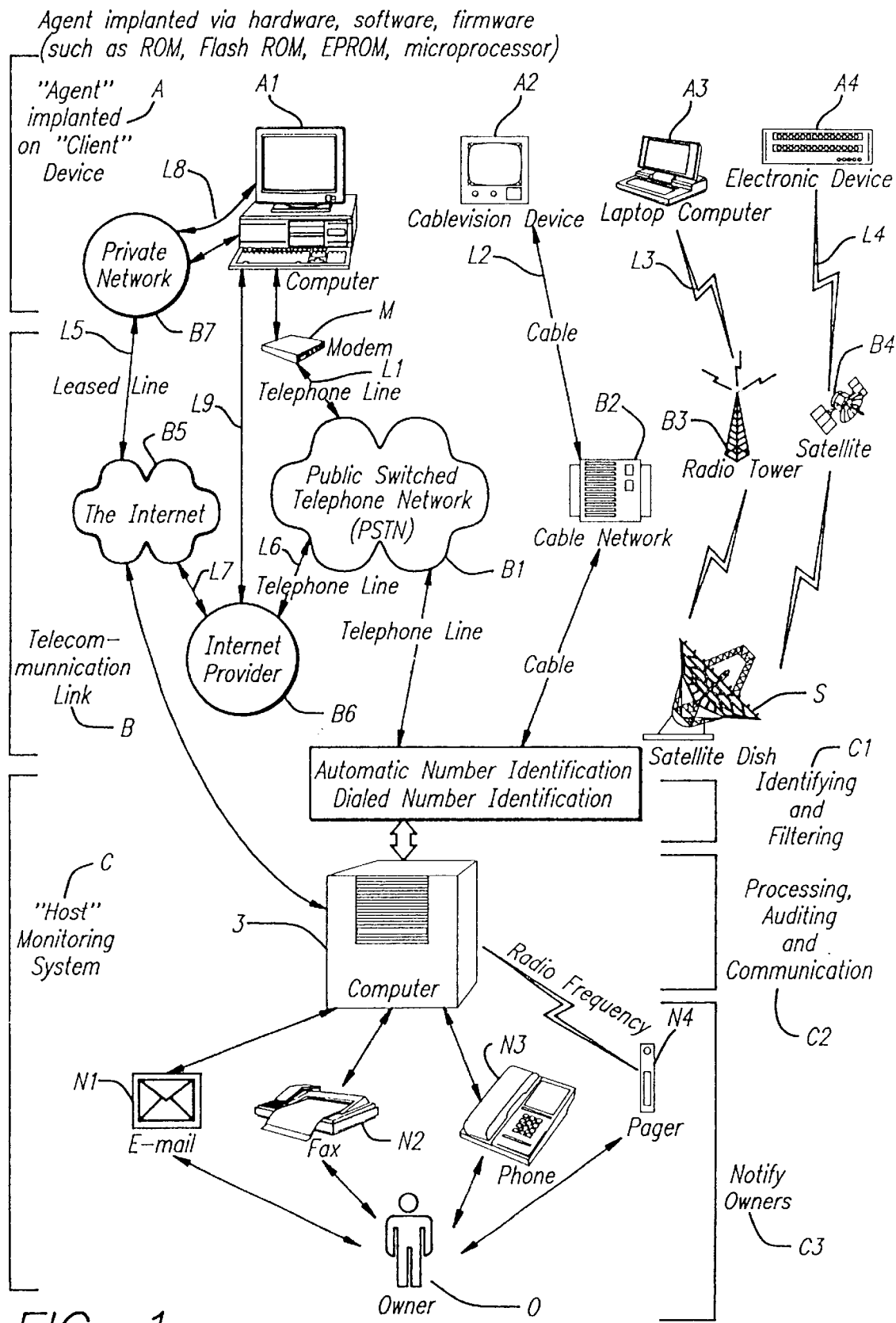
FIG. 1 is a schematic system diagram of a preferred embodiment of the electronic article surveillance system in accordance with the teachings of this invention.

Referring to FIG. 1, the preferred embodiment of the electronic article surveillance system is comprised of three main components: (1) client device A consisting of any one of the electronic devices shown which have been implanted with the Agent; (2) A telecommunication link B such as a switched communications system, the Internet, radio tower, satellite and cable networks; and (3) The host monitoring system C which controls the communications between the client device A and the host monitoring system C.

Referring to FIG. 1, the client device can be a cablevision device A2, laptop computer A3, or other type of electronic device A4 including a cellular telephone or personal digital assistant (PDA). However, for illustrative purposes, the client device consists of a client computer A1 attached to modem M. The host monitoring system C sends and receives data packets from the client computer A1 over a suitable bi-directional transmission medium, such as a common telephone line L1. Telephone line L1 couples the client computer A1 to the host monitoring system C and the host computer 3 through Public Switched Telephone Network B1 (telephone company). The host computer 3 notifies the appropriate parties C3 (owner O, law enforcement agency, or monitoring company) of the status of the client device A via suitable communication means such as electronic mail N1, fax N2, telephone N3 or pager N4. Host monitoring system C also identifies and can filter incoming calls C1, and provide processing, auditing and communication functions C2.

In another embodiment of the invention cablevision device A2 is connected to cablevision network B2 via cable L2. This cable L2 further connects cablevision network B2 to the host monitoring system C.

In another embodiment of the invention laptop computer A3 is connected to radio tower B3 via radio frequency (RF) transmissions L3. These RF transmissions are received by satellite dish S at the host monitoring system C.

In another embodiment of the invention electronic device A4 is connected to satellite B4 via microwave signal L4. Microwave signal L4 further connects satellite B4 to satellite dish S at the host monitoring system C.

In yet another embodiment of the invention client computer A1 is connected to private network (such as a LAN) B7 which is connected to a global network such as the Internet B5 via leased line L5. The connection between client computer A1 and private network B7 can be provided through wireless connection L8. Leased lines L5 and L7 can, according to one embodiment of the invention, transmit data to and from client computer A1 digitally. Host computer 3 is also connected to the Internet B5. In an alternative embodiment of this global network or Internet application, client computer A1 can alternatively, or simultaneously, be coupled to the Internet B5 through modem M which connects client computer A1 to telephone line L1. Telephone line L1 connects to Public Switch Telephone Network (PSTN) B1 which provides access to Internet provider B6 (such as AOL, Netcom, etc.) via telephone line L6. Internet provider B6 provides access to Internet B5 via leased line L7. Alternatively, client computer A1 may be linked directly to Internet provider B6 via wireless communication link L9. Although this aspect of the invention is described in the context of the Internet, it will be understood by one of ordinary skill in the art that the application of this invention to any currently existing of future global network is contemplated herein. Further, although the Internet aspect of this invention is described and illustrated with respect to client computer A1 it should be understood that the Internet application is readily applicable to the other described devices (including laptop computers, cablevision networks, cellular telephones, personal digital assistants, and other electronic devices).

Figure 2:
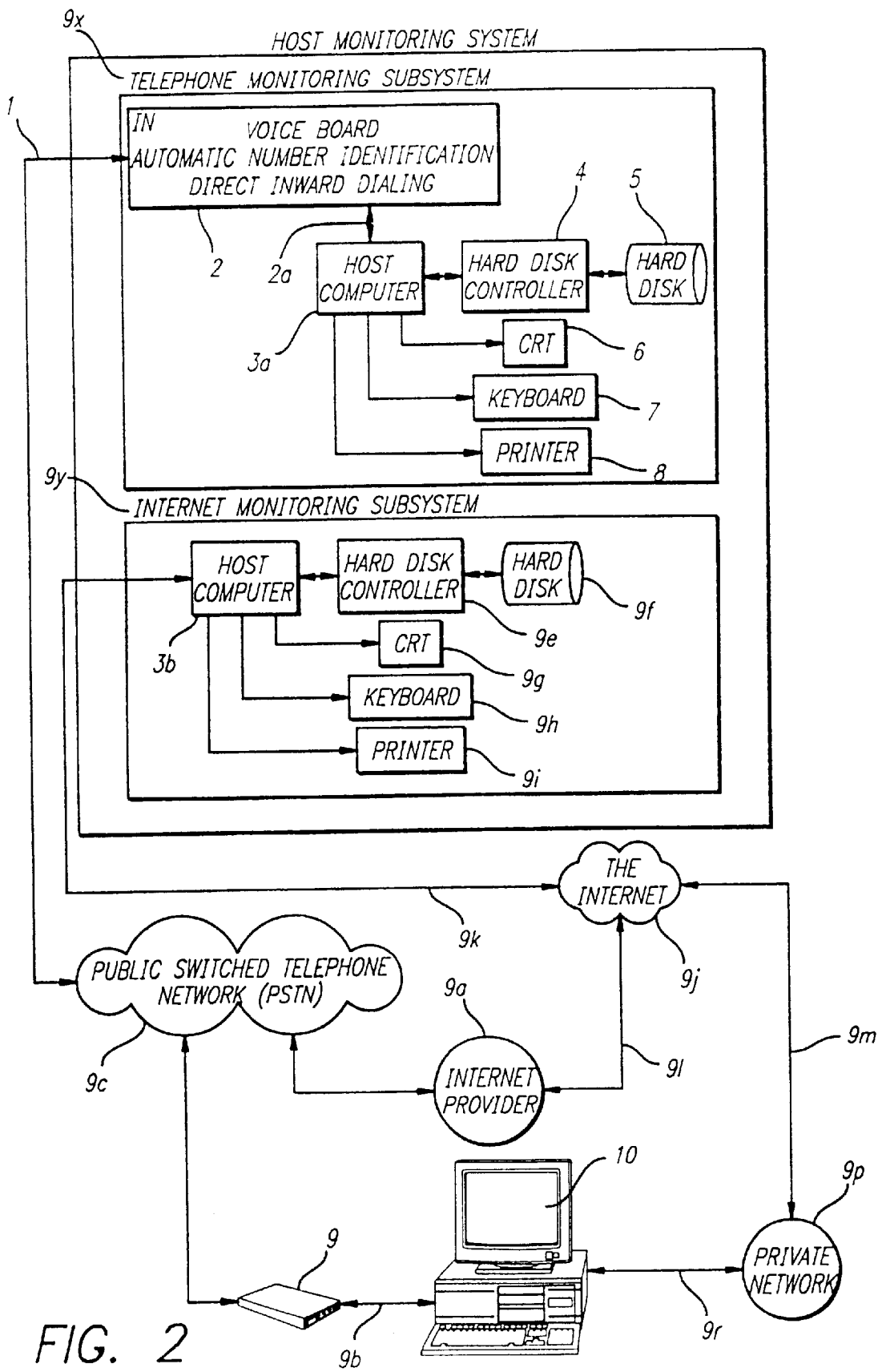
FIG. 2 is a simplified illustration of the functional block diagram of FIG. 1 for the purpose of showing an illustrative embodiment of the present invention.

Referring to FIG. 2, the host monitoring system C has two monitoring subsystems: telephone monitoring subsystem 9x; and Internet monitoring subsystem 9y. Telephone monitoring subsystem 9x monitors information transmitted via telephone line 1 from client computer 10 which has an Agent installed thereon. Internet monitoring subsystem 9y monitors information transmitted via the Internet 9j from client computers 10 which have agents installed thereon.

The telephone monitoring subsystem 9x is comprised of a voice board 2, host computer 3a, hard disk controller 4, hard disk 5, CRT 6, keyboard 7, and printer 8. The host computer 3a is coupled to a suitable display device, such as CRT 6, keyboard 7, and printer 8. The keyboard 7 permits the operator to interact with the host monitoring system C. For example, the operator may use keyboard 7 to enter commands to print out a log file of the clients that have called into the system. The host computer 3a illustratively takes the form of an IBM personal computer. The source codes for the host monitoring system C, in Visual C++ by Microsoft, are disclosed in copending application Ser. Nos. 08/826,098 and 08/558,432 and are incorporated herein by reference.

Telephone line 1 is connected to the host computer 3a by a voice board 2 which is adapted to receive and recognize the audible tones of both caller ID and dialed numbers transmitted via the telephone line 1. Client computer 10 is connected to modem 9 via serial ports 9b. Host computer 3a is connected to voice board 2 via data bus 2a. The modem 9 and voice board 2 are connected to telephone line 1 which is routed through Public Switched Telephone Network (PSTN) 9c in accordance with a conventional telephone system. Client computer 10 and modem 9 form a first telecommunication station, while computer 3 and voice board 2 form a second, or remote telecommunications system. The host monitoring system C sends and receives data packets from client computer 10.

Ring signals are received on phone line 1 as an input to voice board 2. In an illustrative embodiment of the invention, voice board 2 may take the form of the DID/120, DTI/211 and D/12X voice boards manufactured by Dialogic Corporation. The voice board 2 is operative to recognize the ring signal. Then it receives the caller ID and dialed numbers and converts them into corresponding digital signals. As explained in greater detail below, in one embodiment of the invention, the dialed numbers provide in encoded form the unique serial number of the client computer. Host computer 3a decodes the encoded serial number for comparison against a list of reported lost and stolen computers stored in hard disk 5.

In an illustrative embodiment of the invention, the hard disk controller 4 may comprise memory control boards manufactured by Seagate Tech under the designation Hard Disk Controller. The hard disk controller 4 is particularly suitable to control the illustrative embodiment of the hard disk memory 5 manufactured by Seagate Tech under their designation ST-251.

Similarly, the Internet monitoring subsystem 9y is comprised of a host computer 3b, hard disk controller 9e, hard disk 9f, CRT 9g, keyboard 9h, and printer 9i. The host computer 3b is coupled to a suitable display device such as CRT monitor 9g, keyboard 9h, or printer 9i.

Leased line 9k connects host computer 3b to the Internet 9j. Client computer 10 is connected to modem 9 via serial port 9b. Modem 9 and host computer 3b may be connected to the Internet 9j by an Internet provider 9o which uses a communication link such as Serial Line Interface Protocol (SLIP), or Point to Point Protocol (PPP). Alternatively, or simultaneously, client computer 10 may be connected to the Internet 9j through private network (LAN) 9p having gateway to the Internet or the equivalent. In alternative embodiment, client computer 10 may be linked to Internet provider 9o and private network 9p via wireless links L9 and L8 respectively. For illustrative purposes, the communication link is a SLIP link. The Internet monitoring subsystem 9y sends and receives data packets from client computer 10 over the Internet 9j.

Domain Name Service (DNS) queries from the Agent which are transmitted through the Internet 9j are received as input to the host computer 3b. Host computer 3b extracts the host name from the DNS query, and then extracts and decodes the Agent identification (serial number) from this host name. Host Internet monitoring computer 3b uses the decoded Agent identification for comparison against a list of reported lost and stolen computers stored in hard disk 9f. The Internet and DNS queries are discussed in more detail below.

According to one embodiment of the invention, the unique identification associated with each electronic device can be an Electronic Serial Number (ESN). These ESN codes can comprise a string of alphanumeric characters which can be encrypted and encoded. The ESN can be generated randomly by a central delegating body to assure that each electronic device has an ESN which is unique. The ESN can be permanently associated with an Agent security system to enable the unique identification of the electronic device in which the Agent is installed on.

The Agent is a program such as a terminated stay resident program, VxD (Virtual Device driver program), application program (such as Windows service or Windows NT service), or a file filter program. The Agent is installed on hardware, software, or firmware. Some alternative methods of installation are described in co-pending U.S. application Ser. No. 08/558,432 which is hereby incorporated by reference. Once the Agent is installed it will report its identity and its location to the host after specified periods of time have elapsed, and upon the occurrence of certain predetermined conditions. This is further illustrated in co-pending U.S. application Ser. No. 08/558,432.

Once the Agent is installed and running it will periodically (every four hours) report its identity and location on the Internet 9j to the Internet monitoring subsystem 9y. The Agent can also concurrently report its identity and location to the telephone monitoring subsystem 9x through PSTN 9c after specified periods have elapsed, and upon the occurrence of certain predetermined conditions. This is further illustrated in FIGS. 3-1 and 3-2.

Internet and DNS Queries

The Internet is a collection of networks linked together by IP routers and high speed digital links. Computers which have access to one of these networks can run Internet applications to send and retrieve digitally recorded files such as audio and video files. Some of the popular Internet applications are Netscape (used to surf the web), Eudora (for e-mail), Telnet (for logging on to another computer, ping (Internet utility for checking the status of a particular machine). These Internet applications can be run simultaneously. Thus, a computer can be running client programs such as Eudora and Netscape and at the same time be an FTP Server (File Transfer) for other clients that want to transfer files. The applications share the same communications links to the Internet and computer resources (cpu and memory). Thus, multiple applications can simultaneously run without interfering with each other. There is, however, a resultant diminishing effect on performance. The Agent of the instant invention would have virtually no effect on the performance of other applications since it transmits such a small data packet.

Each computer linked to the Internet has a unique Internet host name/IP address. Computer networks comprising one or more of these computers are also given names to form a hierarchial naming structure. For instance, the web site for IBM is "www.ibm.com." The prefix "www" is the name of the computer (server) which is attached to the ibm.com network. Addresses could be coded using numbers, but this would make administration of the Internet extremely difficult. Instead, a method providing for the mapping of Internet host names to network addresses was implemented. This mapping system is the Domain Name System (DNS). It is a distributed, hierarchical administrative system. At the top of the hierarchy is the root domain containing the top level domains (com, edu, net, ca, us, etc.). At the bottom end is a domain name such as cs.berkeley.edu. which corresponds to the computer science department of the University of California at Berkeley. Each domain has more than one authoritative server which can map its Internet host name to its IP (numerical) address.

If a user wants to access the site at www.psmith.cs.berkeley.edu from the address pliving.absolute.com, the user would first input www.psmith.cs.berkeley.edu. into his web browser. The web browser would then send a DNS query to the absolute.com authoritative server to determine if the desired address had been recently resolved (DNS resolutions are cached to enhance the performance of the DNS system). If the absolute.com DNS server cannot resolve this address, then the next DNS server up the chain is checked (the DNS server at the "com" level). If that higher level server also cannot resolve the address, then the root server directs the process down the chain to the top level "edu" DNS server. If the "edu" DNS server cannot resolve the address, then the DNS server at berkeley.edu is contacted. Ultimately, a DNS server is found that can determine the appropriate IP address based on the Internet host name. The IP address is provided to the web browser to enable communication with www.psmith.cs.berkeley.edu.

Once the desired IP address has been determined, packets of data can be sent across the Internet through IP routers.

These IP routers can read the numerical addresses and determine where to send each packet. Each IP router has a unique IP address. Typically, several IP routers need to be contacted to link a user with his desired Internet site. As explained in more detail below, the traceroute routine provides a listing of all IP routers used to enable communication between a client and host.

Functions of the Agent

The Agent may be implemented in the firmware or software of any electronic device, such as a computer. Alternatively, the Agent may be implemented in any component of a computer, as with an electronic component such as the DSP in a modem or the CPU in the computer. Furthermore, the functionality of the Agent may be implemented in the circuitry of any hardware device capable of establishing a communication link through sending and/or receiving packets of data.

One of the important functions of the Agent is to contact the host monitoring system C to report the identity, location, and other information relating to its associated client computer 10. The Agent has to determine the appropriate time for it to call the host monitoring system C. The Agent can contact the host monitoring system C through the PSTN 9c connecting to the telephone monitoring subsystem 9x, or through the Internet 9j which connects the Internet monitoring subsystem 9y. Thus, the Agent can communicate with a host monitoring system C using either the Internet or the PSTN techniques. Alternatively, the Agent may rely concurrently on both techniques.

Figures 1, 3:
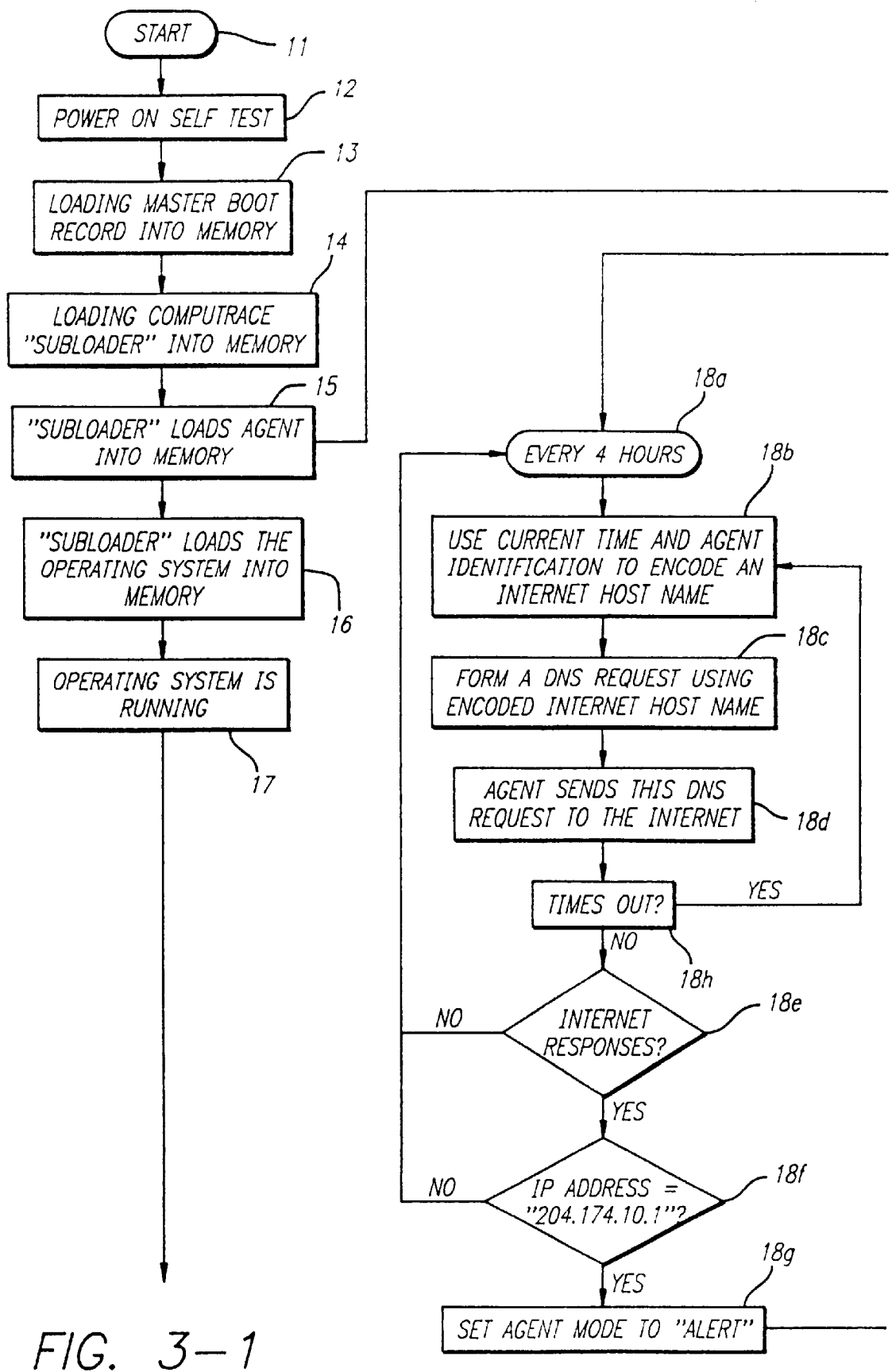
Figures 2, 3:
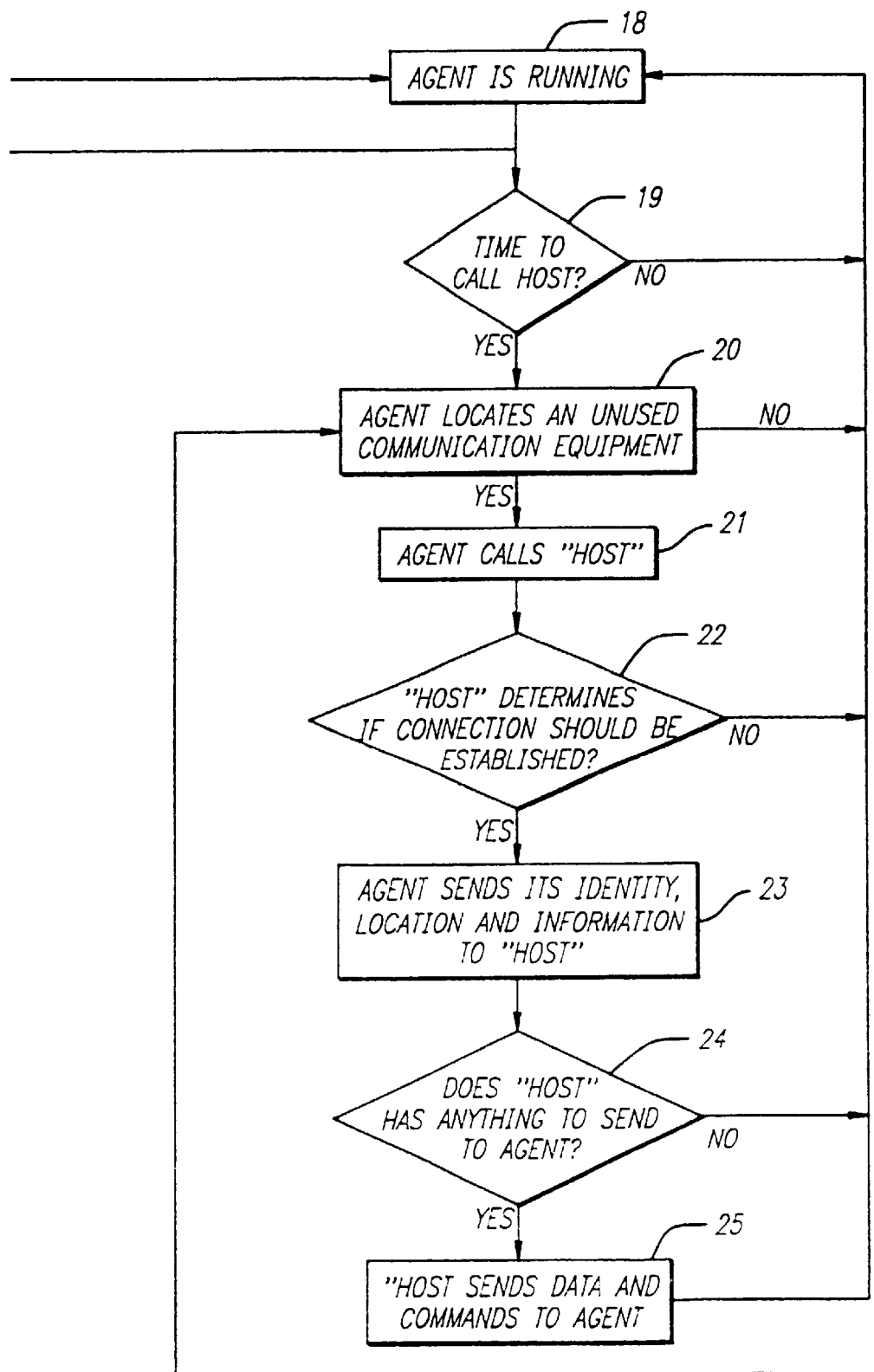

FIGS. 3-1 and 3-2 together are a flow chart of the process in which the Agent is loaded when the client computer 10 is initially turned on or reset, and the manner in which the operating system and Agent run concurrently. In this illustrative embodiment, the Agent is embedded in software. Once the client computer 10 is powered on 11, it performs a power on self-test (POST) 12. The POST tests the system hardware, initializes some of the devices for operation, and loads the master boot record (MBR) 13. Since the MBR was installed with an Agent subloader, the subloader is loaded into memory 14 and executed. The subloader's first task is to load the Agent into memory 15 (which is discussed in detail below in reference to FIG. 5.) Then the subloader loads the operating system (OS) into memory 16 and returns control to the operating system. Now both the operating system 17 and the Agent 18 are running simultaneously.

a. PSTN

In the PSTN application, once the Agent is running 18, it will determine the appropriate time to call the host 19. The time period in which the Agent is waiting for the appropriate time to call the host is the "active" period. The Agent will only call the host when a pre-defined time period has elapsed, or when a pre-determined event has occurred which triggers the client to contact the host. Every one-eighteenth of second the Agent compares the current date and time with the date and time that the Agent is due to call the host. If the Agent determines that it is time to call the host it will transfer to "alert" mode.

In alert mode the Agent will attempt to call the host eighteen times per second until it is successful. Once in alert mode, the Agent does a thorough search within the computer to find free (not currently being used by any running application) communication equipment 20. In an illustrative embodiment, the communication equipment comprises a modem 9. It is contemplated herein that different communication mechanisms (i.e., modem, satellite link, RF link, etc.) can be provided at several of the communication ports. In such a scenario, the Agent would poll the communication ports (corresponding to the different communication mechanisms) to find free communication equipment. If the Agent fails to find any free equipment, then the Agent will abort its attempt to call the host and repeat the cycle 18 within one-eighteenth of a second. However if the Agent locates free communication equipment, it will call the host 21. Upon receiving a call from the client computer 10, the host examines the Agent identity, which according to the preferred embodiment is the serial number of the client computer, and determines if a connection should be established 22. The host establishes a connection when the serial number of the computer contacting the host matches an entry on a list of reported lost or stolen computers. In an alternative embodiment, this call filtering feature is eliminated and the host system establishes a connection whenever there is an incoming call. The list of reported lost or stolen computers is maintained within the host monitoring system C. If the host does not accept the call then the Agent will not call back until the next appropriate time (after predetermined time period has elapsed) 18. If the host accepts the call, then the Agent will send the host its encoded identity (such as its ESN), location (caller ID), any relevant serial numbers of computer components, such as CPU, hard drive, BIOS and any other desktop management interface (DMI) and any other pertinent information such as local date and time 23. The Agent then checks if the host has any data or commands for the client 24. If the host has no data or commands to be sent, then the Agent will terminate the call and repeat the cycle 18. Otherwise, the host will send the data or commands 25 before it terminates the call, and returns to "active" mode 18. Additional details of this work cycle are found in the copending patent application Ser. Nos. 08/826, 098 and 08/558,432 which have been fully incorporated by reference herein.

b. Internet

In the Internet application, which can run alone or concurrently with the PSTN application, the Agent initiates a call to the host at relatively short predetermined intervals. According to the preferred embodiment, in its "active" mode the Agent calls the host every four hours 18a. The Agent uses the current time and the unique Agent identification to encode an Internet host name 18b. The Agent then forms a DNS request using the encoded Internet host name 18c. The Agent sends this DNS request to the host through the Internet 18d. If the agent's attempt to send the DNS request to the Internet times out 18h after a predetermined time period has elapsed, the Agent will sleep for one minute and then repeat the cycle from step 18b. If the call fails due to another error (such as the absence of winsock facilities which enable communication with the Internet, and/or the failure of the computer to be configured for TCP/IP communication) 18e then the Agent will repeat the cycle four hours later 18a. In this way, the Agent inherently checks for the existence of an Internet connection.

After sending its DNS request, the Agent waits for a response. Upon receiving a valid response from the host 18e, the IP address is extracted from the response and compared against a reference IP address 18f. In this illustrative embodiment of the invention the reference IP address is "204.174.10.1". If the IP address equals "204.174.10.1" then the agent's mode is changed from "active" to "alert" on the Internet side 18g. The host will send this reference IP address only when it has determined that the Agent identification matches one of the entries on a list of reported lost or stolen computers stored at the host. If the IP address extracted from the host response does not equal "204.174.10.1" then the Agent remains in active mode and does not call the host for another four hours.

As will be explained in more detail below, when the Agent goes into "alert" mode in the Internet application, the Agent initiates a traceroute routine which provides the host with the Internet communication links that were used to connect the client computer to the host. These Internet communication links will assist the host system in tracking the client computer. The IP address of the source of the DNS query is sent to the host within the DNS query. However, if the source of the query is transmitted through a "proxy" server, then the IP address of the client computer (which may not be unique since it may not have been assigned by the InterNIC) will likely be insufficient to track the location of the client computer. In such a scenario, it is necessary to determine the addresses of other IP routers which were accessed to enable communication between the client and the host. These addresses and the times that they were accessed are compared with internal logs of the proxy server which record its clients' Internet access history. In this way, the client can be uniquely identified and located. Additionally, the transfer of the Internet application into "alert" mode is a condition which triggers the transfer of the PSTN application to "alert" mode.

The system remains transparent to an unauthorized user via implementation of well known deflection methods. Attempts to read or write to the location where the Agent has been installed are deflected in order to prevent discovery of the Agent. When read attempts are made to the Agent location the system generates meaningless bytes of data to be returned to the user. When write attempts are made to the-location where the Agent is installed, the client computer accepts the input data and informs the user that the write has been successful. However, the data is not really stored, and thus the Agent is preserved. The Agent, in order to remain hidden to the user, will not interfere with any running applications unless designed to interfere.

Referring to co-pending U.S. application Ser. No. 08/826, 098, the details describing the background process operations relating to the Internet application are disclosed and are incorporated herein by reference.

ROM Agent

In accordance with another aspect of the present invention, the Agent resides as firmware in ROM. As in the embodiment in reference to FIGS. 3-1 and 3-2, the ROM Agent is installed during a typical boot up sequence to the operating system of a computer. It should be understood that this invention is applicable to other types of computers and electronic devices presently available or as marketed in the future with suitable modifications. The aspect of the invention described below is the process of installing the security software onto a client computer such as the computer workstation 10 or a portable computer without relying on the operating system of the computer. The method of installation is crucial because the software must remain undetectable once installed. Furthermore, the software should be as difficult as possible to erase. In summary, the invention achieves these objects by installing the software in such a manner that it remains hidden to the operating system, such as MS-DOS.

Figure 5:
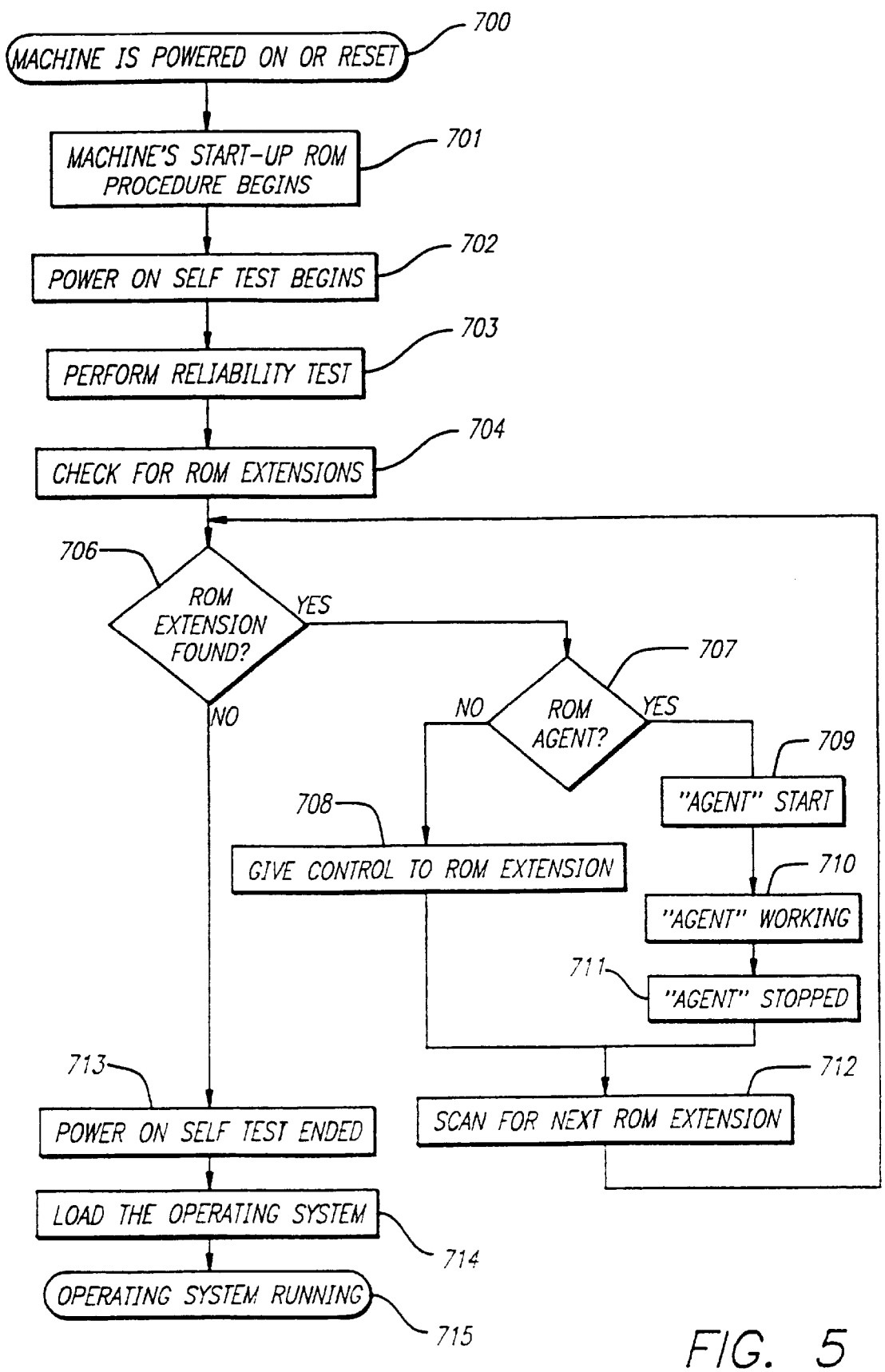
FIG. 5 is an illustrative embodiment in the form of a flowchart showing the Agent startup loading sequence.

Referring to FIG. 5, the Agent startup and loading sequence is described. The computer 10 is powered on and the loading sequence begins 700. As is well known in the art, the machine's start-up ROM procedure 701 in the computer 10 begins when the power is turned on. This process supervises the booting up and loading of the operating system of the computer. It performs the power-on self-test (POST) 702, in fact POST is carried out on every reset of the system, including the time when the power is first turned on. This test has two purposes: it performs a quick test 703 of the basic elements of the system; and it initializes the major hardware components for use. POST tests all of the ROMs on the system board by performing a checksum. This test adds together all of the bytes in the ROM module. As is does the addition, it discards any carry from the 8-bit result. If the final result is zero, the ROM passes the test. The initialization is done immediately after POST, it checks for new equipment and extensions to ROM 704. If it finds any 706, it momentarily turns control over to the ROM extensions so that they can initialize themselves. By design, the ROM Agent is a ROM extension, therefore its initialization routine will receive control 707 from the computer during the machine's start-up ROM procedure.

Once activated the Agent takes control of the whole computer 708. If it determines that it should call the Host computer, it follows the processes described in reference to FIGS. 4A-1, 4A-2, 4B, and 4C. Basically, it finds a free communication port, establishes a communication link to the Host, sends its identity then relinquishes control back to the machine's start-up ROM procedure. After POST ended 713, the machine's start-up ROM procedure loads the operating system from disk 714, and passes control to it 715.

Detailed Operation of Agent Work Cycle

Figures 1, 4A:
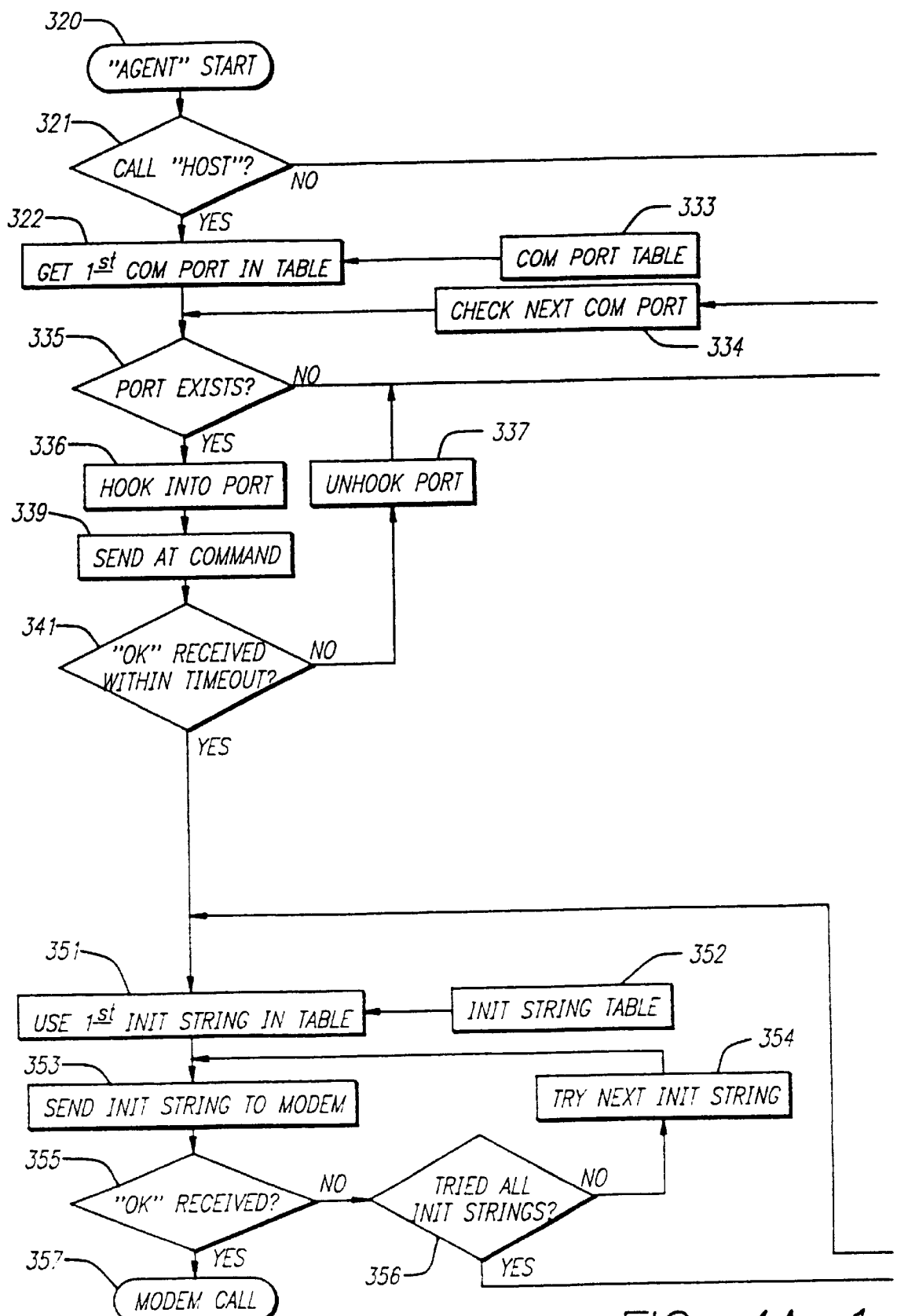
Figures 2, 4A:
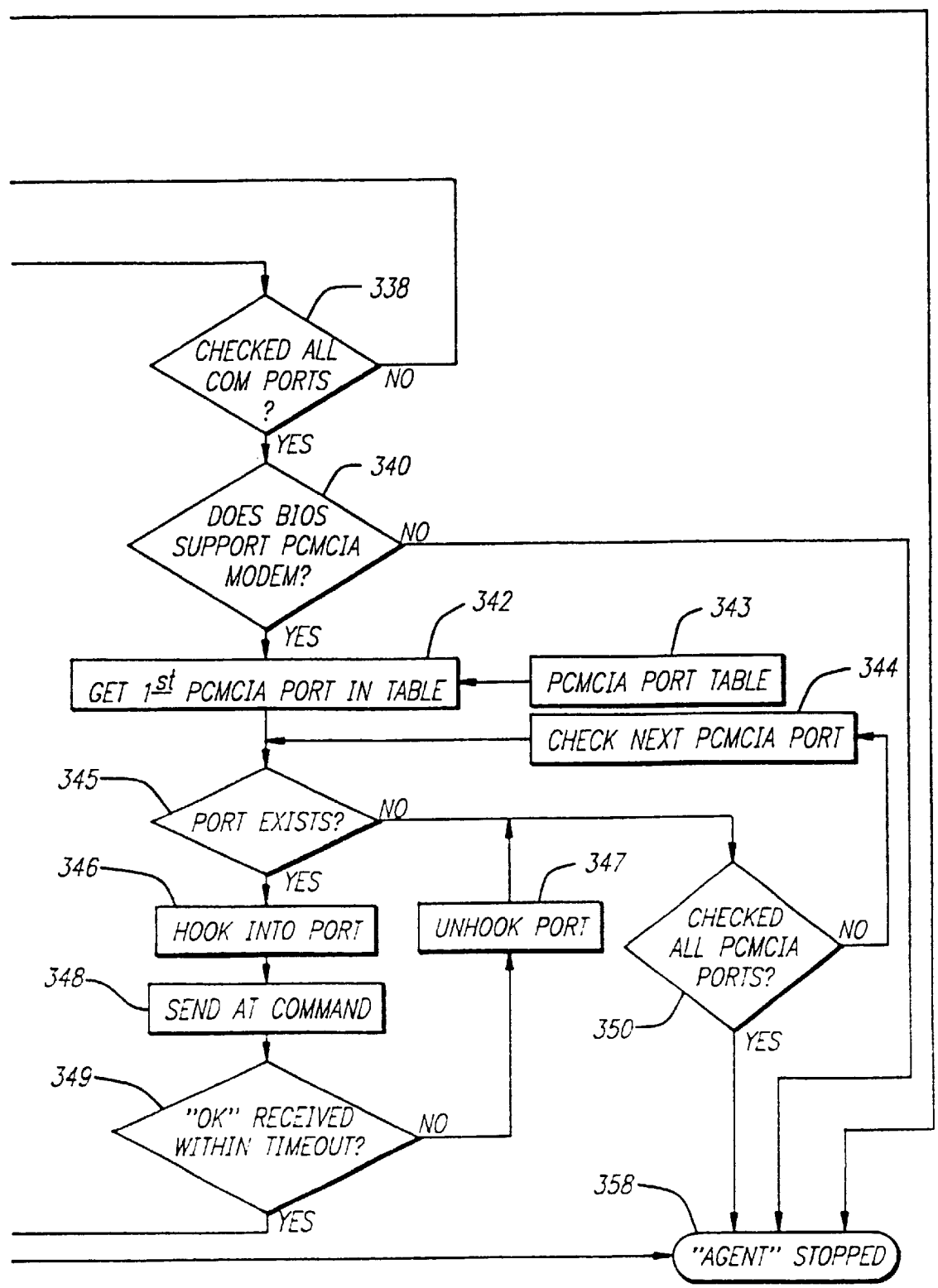

Referring to FIGS. 4A-1 and 4A-2, a flow chart is provided which describes one embodiment of the Agent work cycle in accordance with this invention. The Agent looks for communications ports to be used. There are two types of communications ports: the old by popular communications ports are called COM; and the new PCMCIA ports called PCMCIA. Since COM is the more popular than PCMCIA, the Agent first looks for COM communications ports 322–338, if no COM communications ports are found then it will look for PCMCIA ports 338–350. To look for COM communications ports, the Agent checks all COM port addresses using COM port address table 333 to see if they exist 335. The first one encountered will be dynamically hooked 336 into by swapping the appropriate interrupt handler and unmasking the appropriate interrupt request line. If an error occurs, the next port will be checked 338,334 until either a valid COM port is found or the COM port address table has been exhausted 338. If the COM communication port responds properly, then attempt to check if a modem is currently connected to this COM communications port via issue of the Hayes compatible AT command 339. if the modem does not exist, then the next port will be checked 338. If the modem exists it will respond with an "OK" to the AT command 341.

If no COM ports are found or if no modems are connected to COM communications ports and if BIOS supports PCMCIA modem 340, the Agent attempts to locate PCMCIA communications ports 340–350. The Agent searches for PCMCIA communications ports and PCMCIA modems in steps 342–350 in a fashion similar to the way it searches for COM communications ports 322–338. If no PCMCIA support port is enabled 340 or no PCMCIA ports are found, the Agent will stop 358.

After a functional communications port and a modem are found regardless of their type the Agent will attempt to initialize the modem by sending it modem initialization strings 351–353 using strings from a table of initialization strings. If the modem does not respond with an "OK" 355, this indicates that the initialization attempt failed 356. If the initialization attempt failed, then the next set of strings in the table will be tried 354, and so on until a valid set of initialization strings is found, or the modem initialization string table is exhausted 356 at which point, the Agent will stop 358.

During the system boot process, when the Agent stops at 358, it relinquishes control back to the machine's start-up ROM procedure (see step 715 in FIG. 5).

Figure 4B:
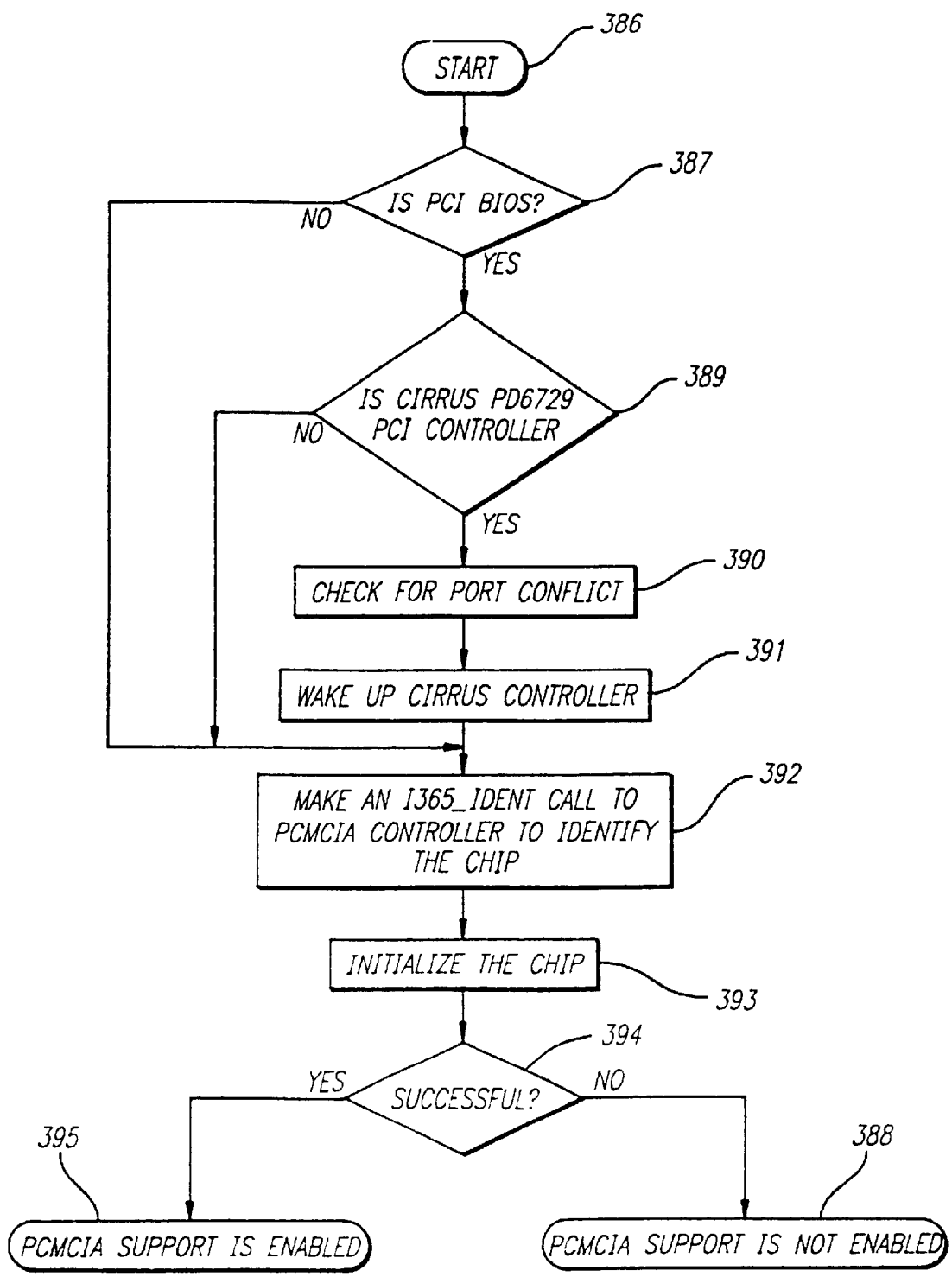
FIG. 4B is an illustrative embodiment in the form of a flowchart showing the routine for determining PCMCIA support in the electronic device.

FIG. 4B describes in detail how the Agent detects whether PCMCIA support is enabled. It does this by checking to see if the computer is using a PCI BIOS 387, and the Cirrus PD6729 PCI Controller chip 389. If these features and chip set are detected, the Agent checks for port conflict 390 and wake up the Cirrus PCI Controller 391. The Agent makes an I365_IDENT call to PCMCIA Controller to identify the chip further 392. Such I365_IDENT call is also made to the PCMCIA Controller even if the PCI BIOS and Cirrus PCI Controller are not present. The PCMCIA Controller chip is then initialized 393, if the chip is initialized successfully then PCMCIA support is enabled 395, otherwise PCMCIA support is not enabled 388. Once a valid and available communications port has been found, and it has been verified that a functional modem is associated with that port, the system will attempt to dial out to the remote host 357 (see also 370 in FIG. 4C).

Figure 4C:
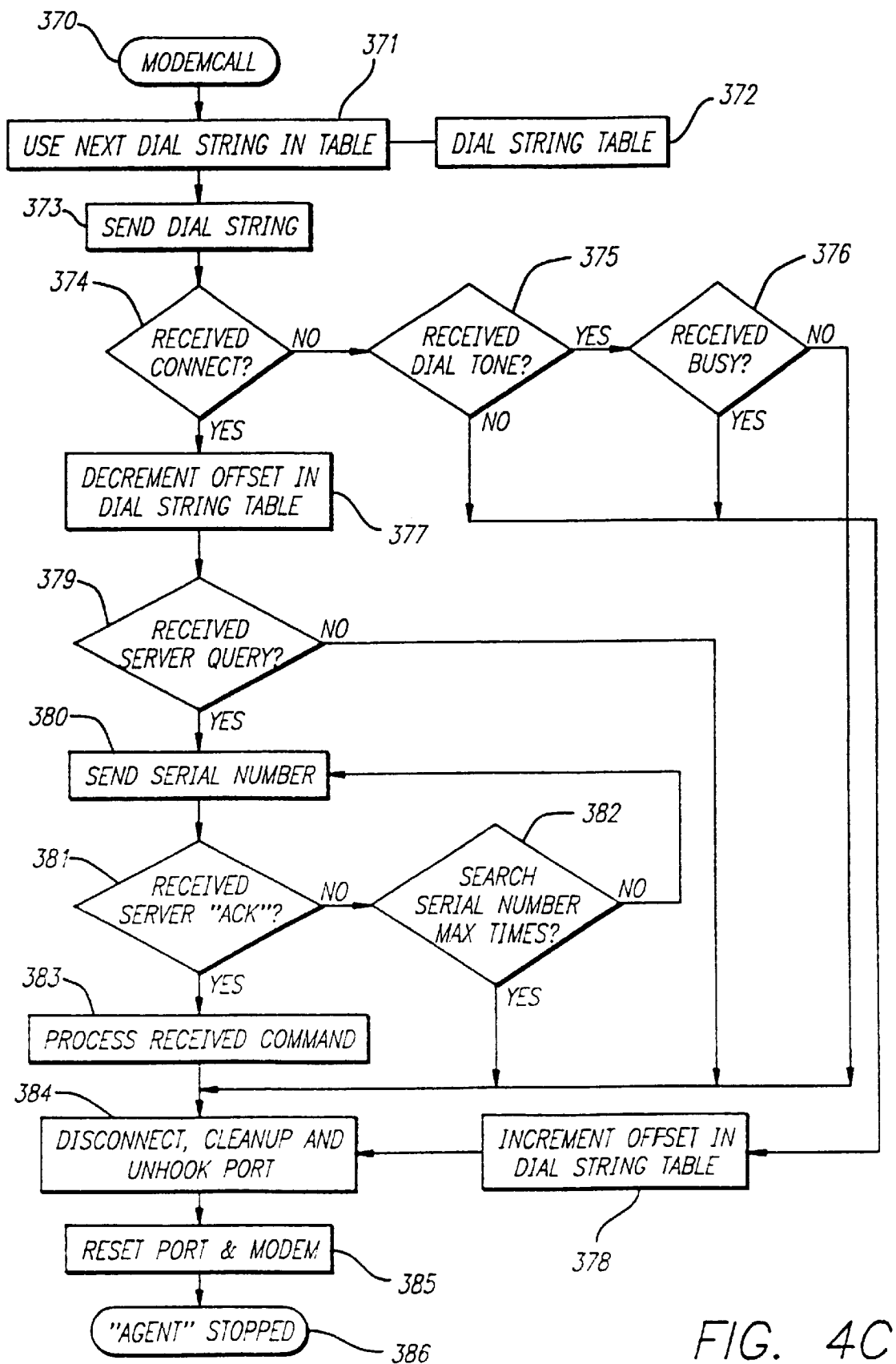
FIG. 4C is an illustrative embodiment in the form of a flowchart showing the modem call routine initiated by the Agent.

Referring to FIG. 4C, the Modem Call routine 370 is illustrated. A dial string table 372 is used 371 to attempt the call since a PBX or switchboard etc. may need to be exited via a dialing prefix. If successful 373–374, the CONNECT result code (numeric or letters) from the modem will be received by the client 374. The Agent also decrements the offset in the dial string table so that the next time the machine is powered on or reset, the current dial string will be used. The host will send a signal ("Query") to the client requesting its serial number. If the client does not receive the "Query" signal 379 it will abort 384, reset the communication port and modem 385, and repeat the cycle 334, 343. If the client receives the "Query" signal, then the serial number is sent 380. At this point, telecommunications have been established and the agent-host transaction begins. If the transaction succeeds, the resultant state will be "active", otherwise it will be "alert". If a "NO DIALTONE" or "BUSY" event occurs 375–376, the offset in the Dial String Table will be incremented 378 so that the next dial string will be attempted the next time the machine is powered on or reset.

The Agent to remote host transaction involves the sending of the computer serial number 380 via the telephone company or carrier service. The "Caller ID" is implicitly received by the remote host (typically during the initial telecommunications event "RING"). Upon the occurrence of the event "CONNECT", the host sends the client a vendor specified message called "QUERY" 379 which in effect tells the client to send its serial number 380. This involves the host acknowledging that it has received 381 and processed 383 the serial number thereby validating it. The client will attempt this call a pre-defined number of times 382 before it gives up (disconnects, cleanups, unhooks port 384, resets communication port and modem 385, repeats the cycle 300). At this point, the modem disconnects 384, and any other cleanup necessary occurs (such as changing the date of the last call to the present). Finally, the resultant state will be reset to "active" and the Agent will remove all traces of it in memory to avoid being detected by unauthorized users. The Agent then stops 386. During system start-up, when the Agent stops, the machine's start-up ROM procedure continues to scan for the next ROM extension (see step 712 in FIG. 5.)

If the computer that called in was not reported stolen, no further action with regard to the computer system that called in will be taken. If, however, the serial number transmitted to the remote Host matches one of the serial numbers on a currently valid list of stolen computers, further processing will occur to facilitate the recovery of the missing equipment. Such processing includes, but is not limited to, placing either an automatic or manual call to the local authorities in the vicinity of the missing equipment or the owner of such equipment.

Instead of making a modem call via the PSTN, the BIOS Agent may be configured to communicate with the host monitoring server via the internet in a similar fashion as explained in reference to FIGS. 3-1 and 3-2.

Variations on Loading the BIOS Agent

Four alternative ways of installing the Agent security system during the disk boot were disclosed in co-pending U.S. application Ser. No. 08/558,432 which is hereby incorporated by reference. In one of the alternative methods of installation the Agent was disposed on the ROM BIOS using hook interrupts and saving and restoring CPU registers. That method required these brute force techniques to enable the Agent to be compatible with certain operating systems. Operating system independent Agents are further disclosed herein.

Figure 6A:
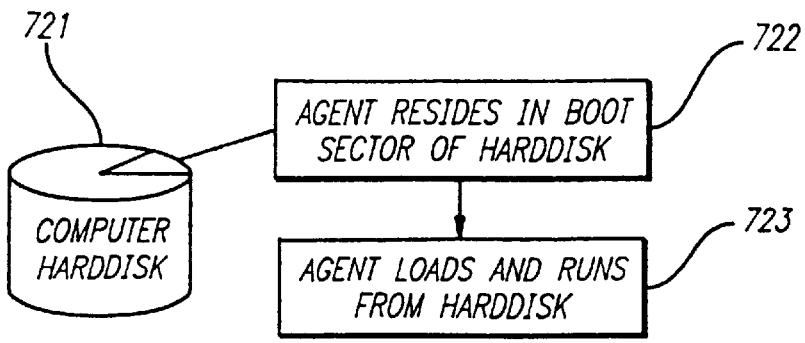
FIGS. 6A, 6B, 6C and 6D are illustrations of alternatives to loading of the Agent.

Referring to FIG. 6A, the Agent is implanted in the boot sector of the computer's hard-disk 721. The Agent is loaded into memory when the computer is turned on or reset 722. Once active, the Agent executes in memory 723 until the computer is powered down or reset.

Figure 6C:
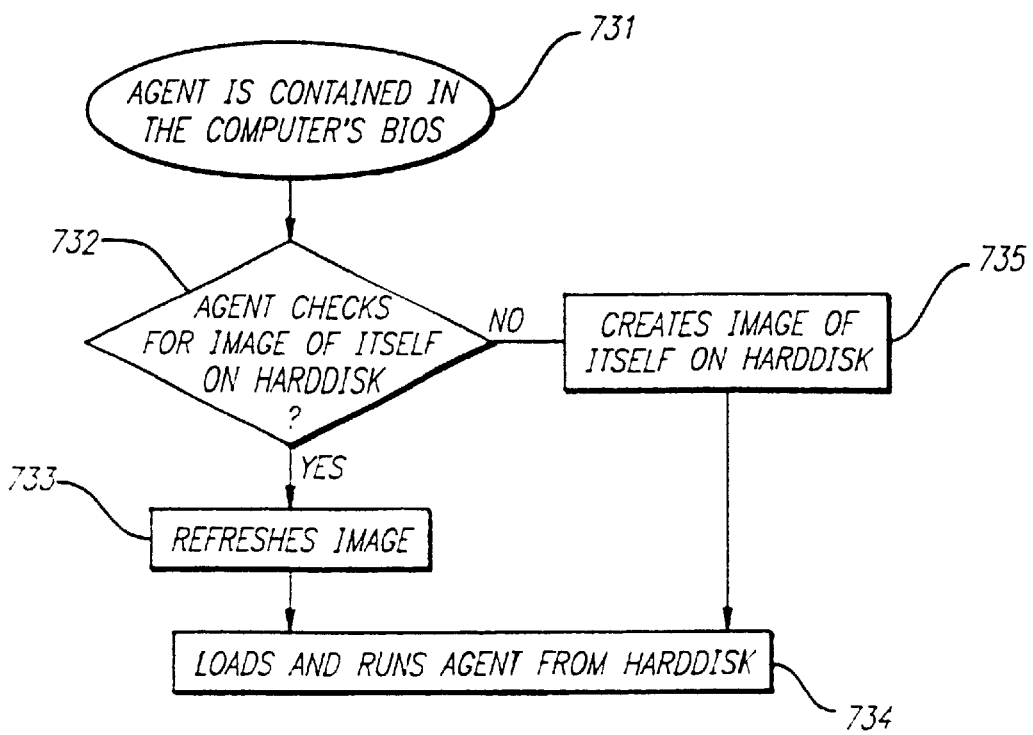
Figure 6B:
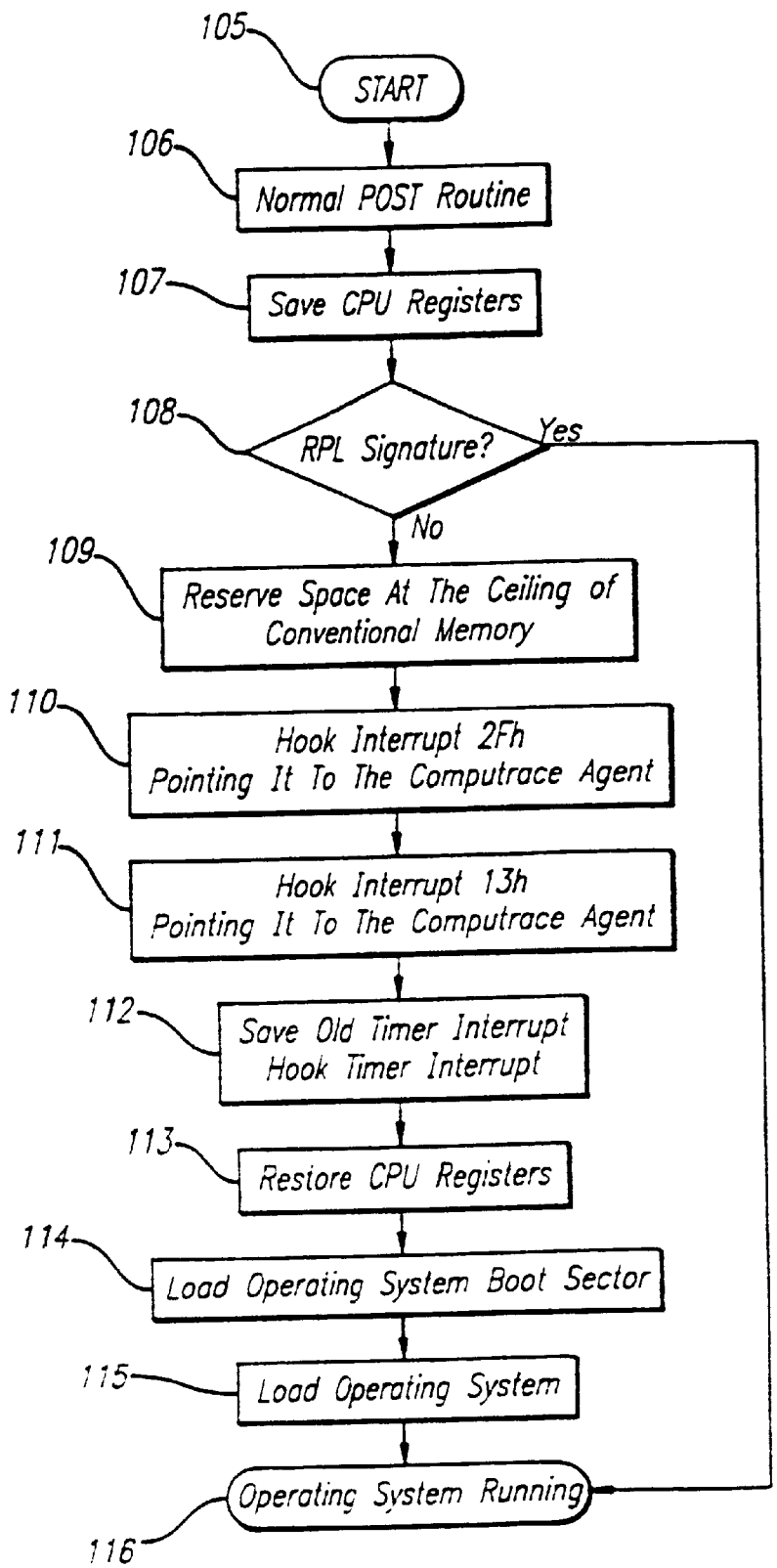
Figure 6D:
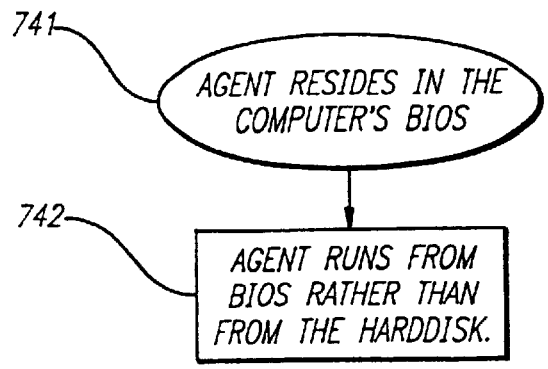

Referring to FIG. 6B, the Agent loading sequence is described 105–116 for loading the Agent via a ROM BIOS. This schematic illustrates an embodiment of this invention on firmware. The sequence is analogous to that disclosed in the parent applications for the embodiment in which the Agent is embedded in the operating boot sector embodiment. However, the Agent is loaded from the ROM after the CPU registers are saved 107. At that time the ROM can take control of the system and load the Agent. Once the CPU registers are restored 113, the ROM can no longer load the Agent. More particularly, after the computer 10 is powered on or reset, the loading sequence begins 64. As is well known in the art, the computer 10 is performs an initial testing routine to assure that all components are working properly 65. Illustratively, the program incorporated is the IBM-PC compatible Power-On Self Test ("POST") routine. Next, in an effort to maintain the transparency of the Agent, the CPU registers (corresponding to the current state of the computer) are saved 107. Before the Agent is installed there is a check for a Remote Procedure Load ("RPL") signature 108. If the signature is present, this indicates that the Agent is already in memory and will not be loaded again. However, if there is no RPL signature, then preparation is made to load the Agent. First, space is reserved for the Agent at the ceiling of conventional memory 109. Next, Interprocess Communication Interrupt (2Fh) is hooked 110 which enables communication with other programs. Interrupt 13h, which is the disc input/output handler, is hooked 111. The old timer interrupt is saved, and new hook timer interrupt is put into place 112. Now the CPU registers are restored 113 in order to maintain the transparency of the system. The original operating system boot sector is loaded 114. The original operating system had been moved to accommodate the agent installation. Finally, the operating system is loaded 115 and running again 116.

Another configuration the BIOS Agent is shown in FIG. 6C. the Agent is implanted into the computer's BIOS 731 and/or bootstrap BIOS. When the computer is turned on or reset, the Agent loads itself into memory and checks for an image of itself on the computer's hard-disk 732. If an image of the Agent is found, that image is refreshed 733 and run from the disk 734. If an image is not found, one is created on the disk 735. The newly created image is then loaded into memory and run from the disk 734.

Turning to the operating system independent methods, referring to FIG. 6E, the Agent is implanted into the computer's BIOS 741 and runs directly from the BIOS 742. As more fully discussed below, variations of the BIOS Agent may include implanting the Agent in a DSP of a modem, a CPU of the electronic device, a hard wired circuitry or an integrated circuit in the electronic device.

All of the above BIOS Agents may be configured to communicate with the host monitoring server via modem call and/or internet.

Segmented Agent

Figure 7A:
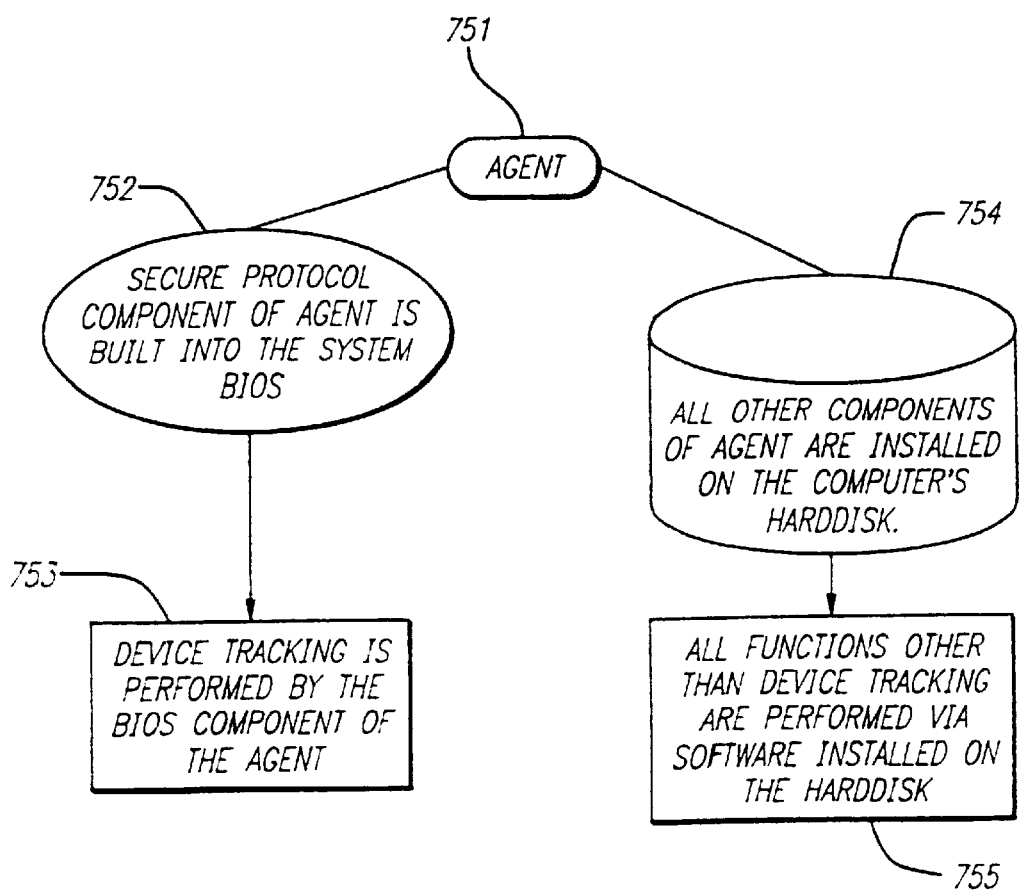
FIG. 7A is a schematic block diagram illustrating the alternate embodiment of Segmented Agent.

Referring to FIG. 7A, an alternate embodiment of the operating system independent BIOS Agent is described in which the Agent 751 is segmented into two components. The Secure Protocol Component (SPC) is implanted into the computer's BIOS 752. The SPC handles device tracking function only 753. Additional functions, such as asset and configuration management, are handled by a High Level Component (HLC) that resides on the computer's hard-disk 754 and run from the disk 755.

Figure 7B:
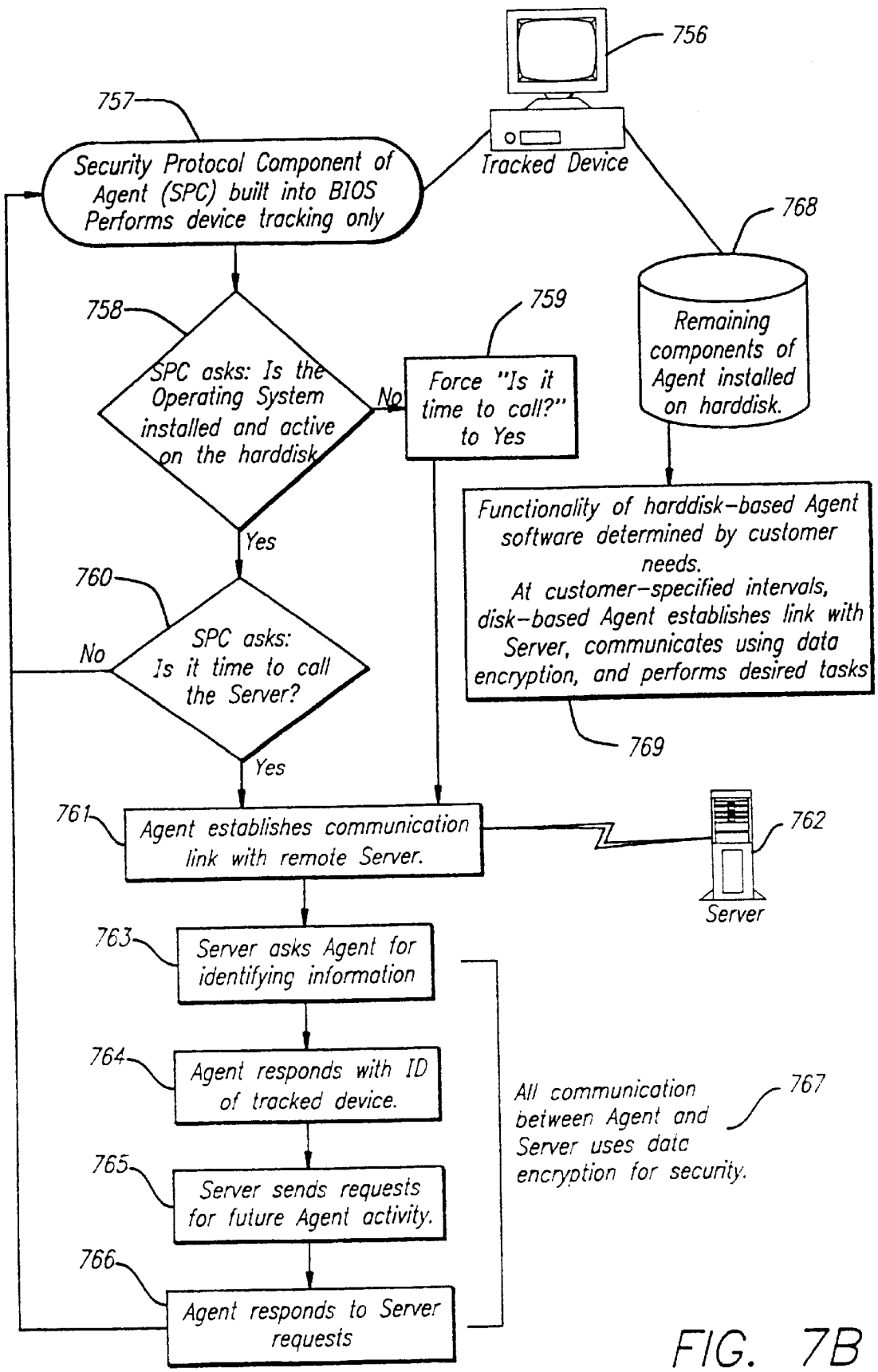
FIG. 7B is a flow chart of the Segmented Agent process.

Referring to FIG. 7B, the embodiment of FIG. 7B is described in greater detail. The SPC 757, upon recognizing machine events and at specified intervals, checks to see whether the Operating System is installed and active on the hard-disk 758. Events that can be recognized include Power Management events and Plug-and-Play queries such as the ACPI (Advanced Configuration & Power Interface) adopted by Microsoft and other developers or SMI (System Management Interface) adopted by Intel and others. Power Management events are generated from the hard-disk powering down, the CPU switching speeds, or the display switching on or off. Plug-and-Play queries are received from the Operating System when it is identifying devices installed in the machine and loading drivers to control those devices. If the SPC is able to communicate with the Operating System, it determines if it is time to contact the Server 760. It does this by checking a "counter" which is reset to a certain value during bootup and then decremented with each check that is performed. Any time the counter reaches 0 (zero), the SPC contacts the Server 761. If the SPC is unable to establish a communication link with the Operating System, it assumes that a problem exists with the system and forces the counter to 0 (zero) 759. The SPC then immediately establishes a link to the Server 761 by any of the means discussed before regardless of the amount of time that has elapsed since the last connection.

Once a communication link has been established between the SPC and the Server 762, the Server asks the SPC to identify itself 763. The SPC responds with the ID of the device that is being tracked 764. The Server then sends a request to the SPC 765 asking that it perform one or more tasks at a specified future time (such as contacting the Server again). At the appropriate time, the SPC responds to any such request 766. All communications between the Agent and the Server will incorporate data encryption 767 to provide an additional layer of security and prevent the sophisticated and user from intercepting or transmitting messages in an attempt to interfere with device tracking. The Server will determine the location of the tracked device with whatever means are available through the particular communication service being utilized. For instance, if a link were established over standard phone lines, Caller ID/ANI could be used to fix the location, or if a link were establish over Internet, the ID address can be used to fix the location.

The capabilities of the software installed on the hard disk would be based upon the needs of the customer and might include advanced asset, management or system administration functions. The hard disk-based components of the Agent would perform in a method similar to that of the SPC, contacting the Server at specified intervals and transmitting data back and forth as necessary to complete its scheduled tasks 769.

Alternatively, the SPC may be implemented in the CPU of the computer 10, the DSP of the modem, or in the form integrated circuits or hard wired circuits, as more fully addressed below.

The segmented Agent may be configured to communicate with the host monitoring server via modem call and/or internet.

Modem Agent

Figure 8A:
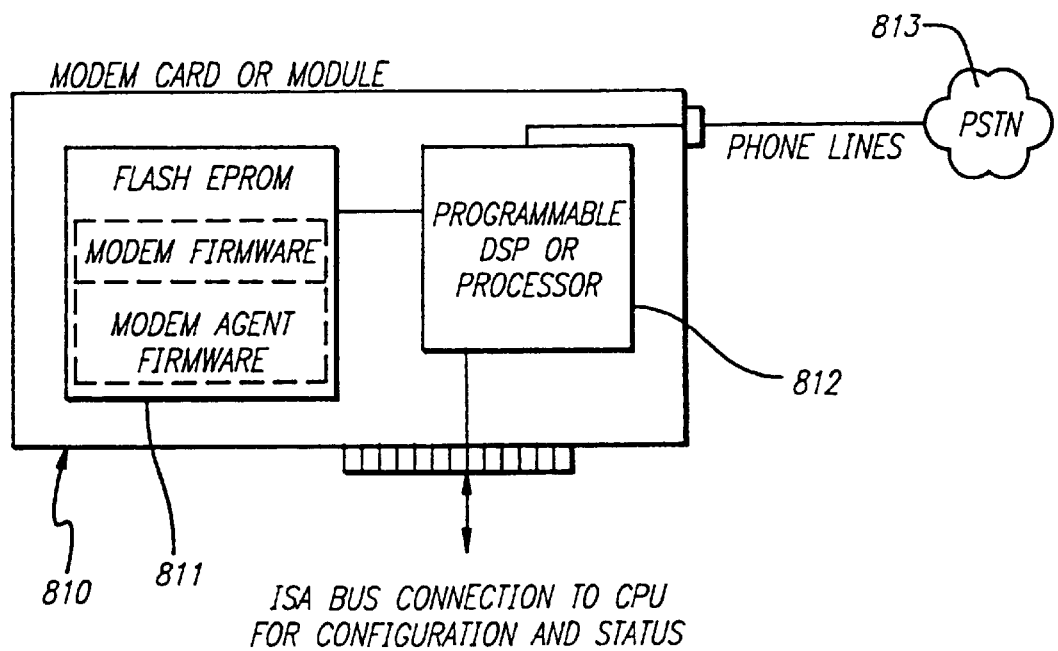
FIGS. 8A–F are block diagrams illustrating the alternate embodiment of Modem Agent.

Referring to FIG. 8A, according to another embodiment of the invention, instead of installing the ROM BIOS of the computer, the Agent is installed into the Flash ROM (or EPROM) 811 or DSP 812 of the computer modem, either on a plug-in card or built-in on the motherboard (810) of the computer. The Agent can be imbedded into the modem Flash ROM (or EPROM 811) or DSP 812 by an installation utility that runs on the computer, or it can be embedded into the modem Flash ROM or DSP by the manufacturer. The Modem Agent can communicate with the Host Monitoring System through the PSTN 813 at scheduled times without the involvement of the PC processor. Thus, the Modem Agent is independent of the software running on the computer including the operating system.

The Modem Agent enables a monitored computer to communicate to the monitoring server even if a new disk drive is installed. This provides a much more secure method of tracing the location of stolen computers where modifications are made to the computers before they are used. In the case where computers are stripped for parts, the Modem Agent will still be able to be located. Integration of the Modem Agent onto the motherboard of the computer will not allow the Modem Agent to become separated from the motherboard, protecting the most important component of the computer.

A. Modem Hardware Architecture

Figure 8B:
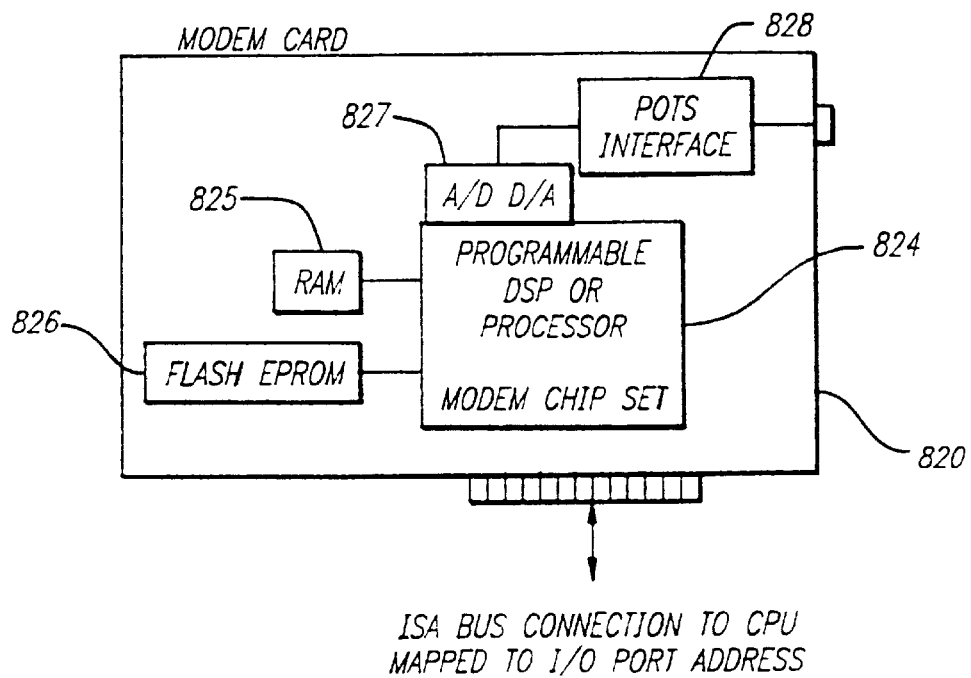
Figure 8C:
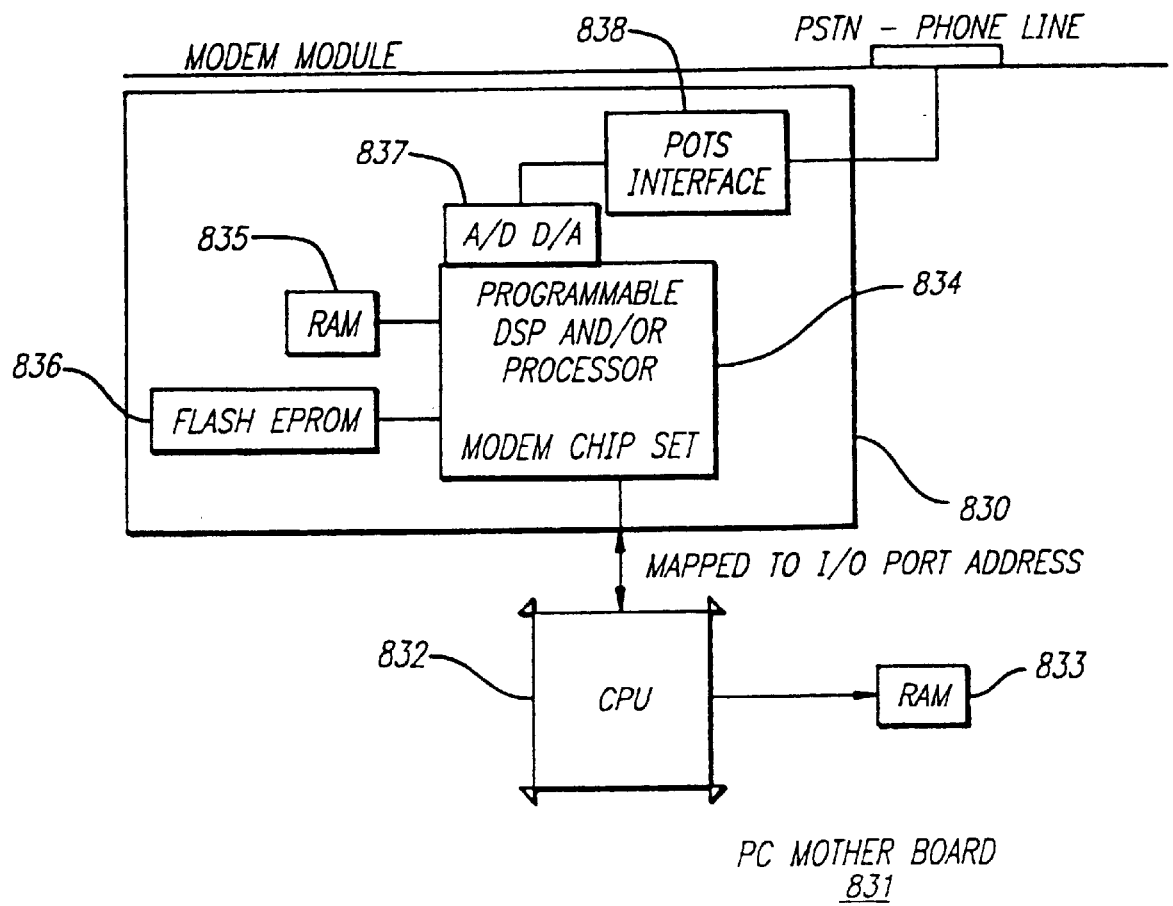

The hardware architecture consists of a programmable modem either in a plug-in card 820 or a module 830 integrated onto the motherboard 831 of the monitored computer as shown in FIG. 8B and FIG. 8C respectively. Plug-in card based modems 820 are usually programmable but can be removed from the monitored computer. This prevents the modems from tracking the main portion of the computer. Modem modules 830 integrated directly onto the motherboard can not be removed from the main portion of the computer. The modem module 830 is coupled to the CPU 832 and RAM 833.

The modem module 830 or plug-in card 820 will contain a modem chip set 824, 834 that provides the modem communication (encoding and modulation) and modem controller functions. Depending on the manufacture the chip set, it may contain a single or multiple DSPs and possibly a microcontroller. The DSP will usually provide the communication software for encoding and modulation. The microcontroller will usually provide the modem controller software but some chips set provide two DSPs for both functions. Along with the chip set the modem will contain. RAM 825, 835, a flash programmable EPROM 826, 836, A/D and D/A converters 827, 837 as well as a POTS interface 828, 838.

The RAM is used by the modem chip set as its main memory. The flash programmable EPROM is used to store the modem software. A/D and D/A converters with the POTS interface allow the chip set to seed/receive signals over the analog PSTN phone lines.

While the Modem Agent is described below in connection with communications with the host monitoring server via modem call, the Modem Agent may be configured with the additional and/or alternate function of communicating with the host monitoring server via internet.

B. Modem Agent Software Architecture

Figure 8D:
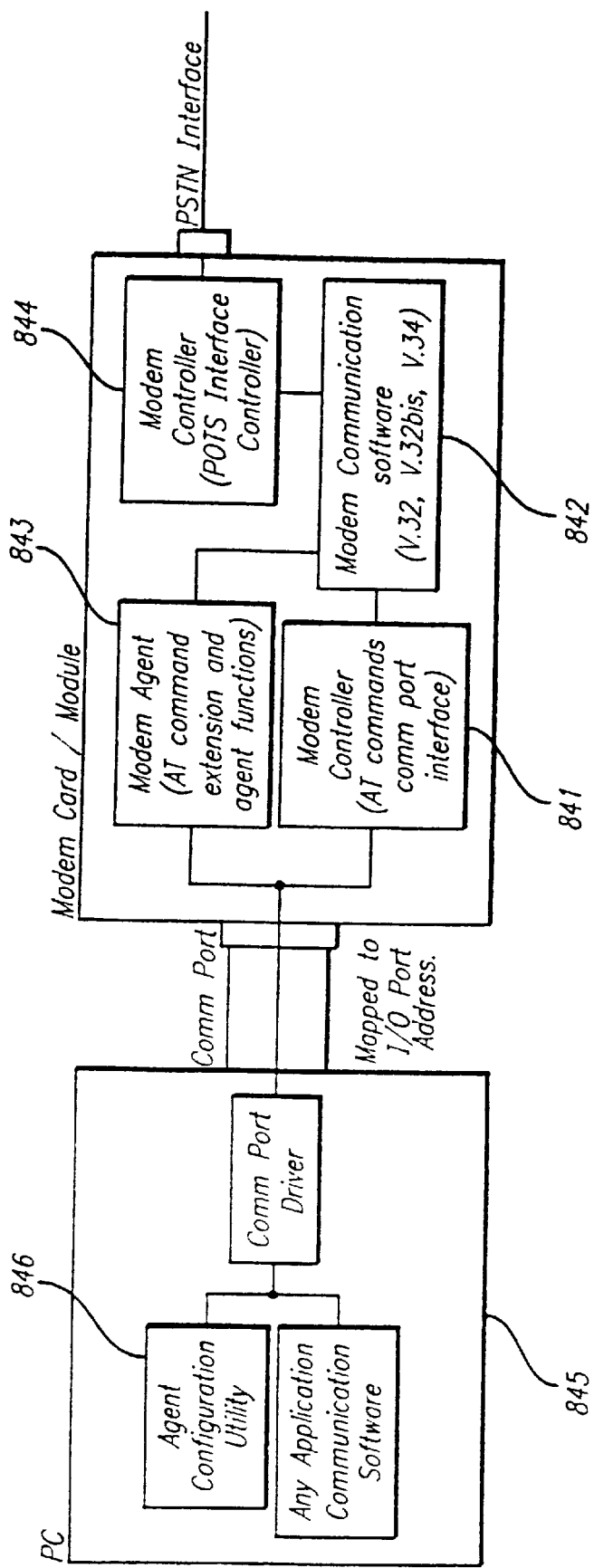

The Modem Agent resides on either a software upgradable ISA of PCI modem card or a memory mapped/ISA mapped modem module integrated on the mother board. These modems usually consist of two software entities, the controller software 841 and the communications software 842 as shown in FIG. 8D. The controller software 841 contains the software that controls the interface between the PC 845 and the communications software 842 as well as the POTS interface 844. It allows application software to communicate with and control the actions and parameters of the communication software 842.

The communication software 842 contains the modem communication functionality that provides the encoding and modulation schemes employed during communications. The communication software usually runs on a DSP while the controller software usually runs on a separate microcontroller. However, some modems use a single processor to provide both functions. The communications software is usually not modifiable and is proprietary to the manufacture of the modem chip set.

A third software entity, the Modem Agent 843, must be added to the modem software. The Modem Agent will reside on the processor that contains the Modem controller or the Flash EPROM or ROM. The Modem Agent will receive extended AT commands from the Agent Configuration Utility 846. These extended AT commands will be proprietary to the host monitoring service and will each require a password. The Modem Agent will also be able to communicate with the host monitoring server directly. This capability will be provided by the call management function within the Modem Agent. (See FIG. 8E and discussions below.)

The Modem Agent 843 will run in parallel to the modem controller 841 such that no modifications to the manufacturer's software in the modem controller will be required. The modem controller will respond to the extended AT commands with "ERROR". However, the Modem Agent will qualify the error response with an extension response to indicate that the command was recognized and executed correctly if the syntax of the command and the password are correct. This will allow the standard modem controller code to function as is and still allow the Modem Agent to respond to commands.

Figure 8E:
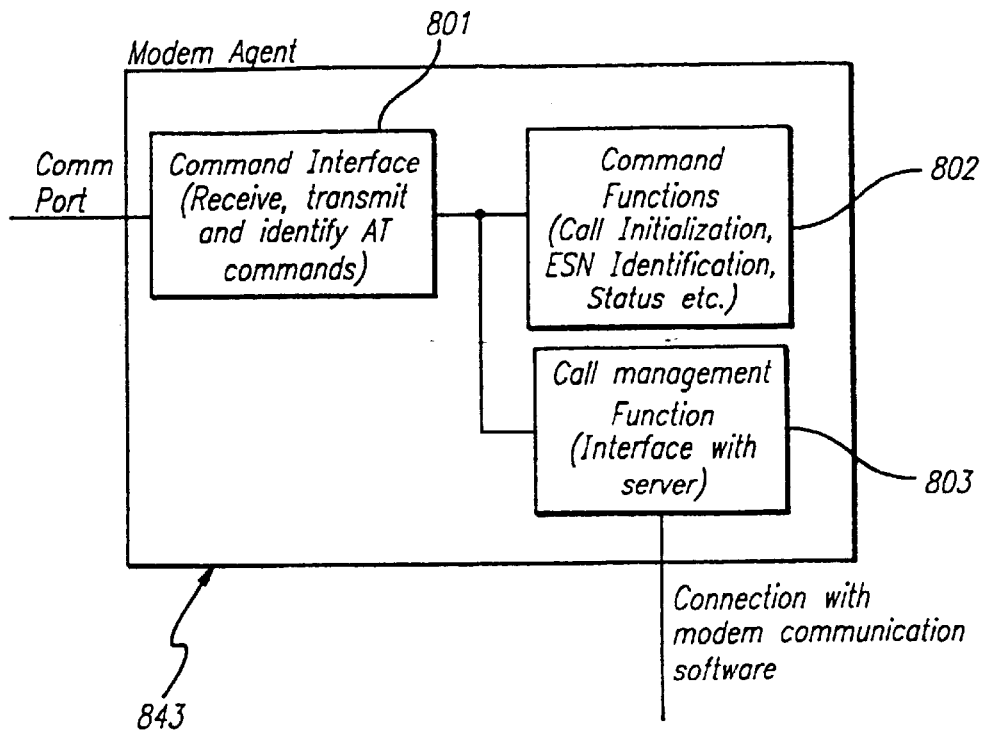

Referring to FIG. 8E, the Modem Agent 843 consists of three main program components: the command interface module 801, the command function module 802, and the call management function module 803. The command interface module 801 will handle all communications with the PC interface, in parallel with the modem controller. This will allow the command module to communicate with PC applications. Its functions will include receiving/transmitting of controller characters from/to the PC as well as AT command identification. The command interface module 801 supports extended AT modem commands that enable control and configuration of the Modem Agent. The extended AT modem commands include but are not limited to: set ESN, set dial strings, enable monitoring, disable monitoring, report status, initiate monitoring call, and set local time. All of the extended commands are password protected to prevent unauthorized access and detection of the Modem Agent.

The commands function module 802 implements the functionality of the extended AT commands as well as functions required to communicate to the monitoring server. This could include call initialization, call scheduling, ESN identification, status monitoring, mode management, etc.

The call management function module 803 will provide the interface to the monitoring server. It will allow the command module to communicate with the monitoring server. Its functions will include receiving/transmitting of data from/to the monitoring server and controlling the modem communication inferface. The call management function module 803 contains the Secure Protocol Component (SPC) of the Segment Agent as described before.

C. Modem Agent Functions

The Modem Agent provides two sets of functions. Firstly, to communicate with the PC's CPU, a set of extended AT commands are required. Secondly, to communicate with the host monitoring server, a set of functions are required.

1. Extended AT Commands

The Modem Agent supports extended AT commands to:

a. set ESN

This command allows a configuration application to modify the ESN number that the Modem Agent uses when connecting to the host monitoring server. This command is used to configure new Modem Agents as well as change the ESN when a new number has been assigned to it.

b. set dial strings

This command allows a configuration application to modify the number dialed when contacting the host monitoring server. This command is used to configure new Modem Agents with the correct dial-up phone number for the host monitoring server as well as modify it if a change is required.

c. enable monitoring

This command allows a configuration application to enable the monitoring service of the Modem Agent. This command is used to re-enable monitoring if the service has previously been disabled.

d. disable monitoring

This command allows a configuration application to disable the monitoring service of the Modem Agent. This command is used when the owner of the monitored PC wishes to terminate the electronic device trace service. The command will turn off the Modem Agent functions and AT commands with the exception of the enable monitoring command.

e. report status

This command allows a configuration application to report the status of the Modem Agent.

f. force contact with Monitoring Server

This command allows an application to force the Modem Agent to contact the host monitoring server. This command can be used, for example, to test the Modem Agent configuration.

g. set local time

This command allows a configuration application to set the current time on the Modem Agent. This is to allow the Modem Agent to synchronize scheduled calling times to local time.

h. set Alert Mode interval

This command allows the interval of the alert mode (as described before) to be set.

All commands are password protected. The Modem Agent is shipped with a default configuration. The password accompanying each command will be calculated from the argument of the command. This will make the AT commands more difficult to defeat and will not allow the application communicating with the Modem Agent to become out of sync with its password. The calling application must take care to not send AT commands while the modem is being used by another application.

2. Modem to Server Functions

For the Modem Agent to communicate with the host monitoring server, a set of functions are required to:

a. contact and communicate with monitoring server

Figure 8F:
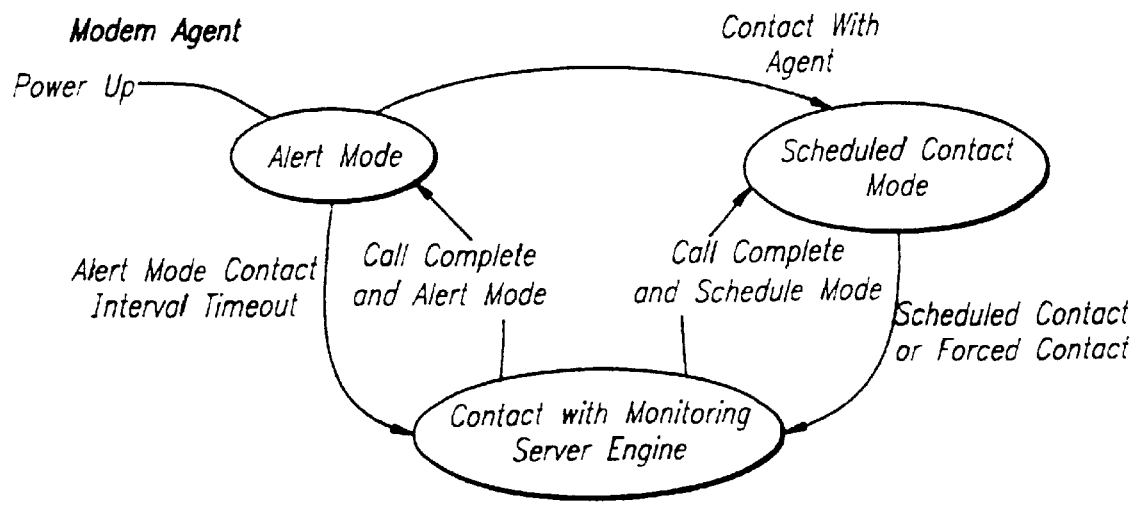

When monitoring is enabled, the Modem Agent calls the host monitoring server's phone. The Modem Agent sends its ESN to the host monitoring server. The host monitoring server tells the Modem Agent when to call again. The Modem Agent calls back at the scheduled time. A state diagram of the contact and communication mechanism is shown in FIG. 8F.

b. schedule communications with monitoring server

The Modem Agent is not able to schedule contact times on its own because it does not have access to a real-time clock. However, the Modem Agent is capable of measuring the passage of time. Thus, there is a need to initialize the current date and time in the Modem Agent upon power-up of the modem. This function can be provided by the HLC in a segmented Agent configuration described before, for example. If the modem Agent does not receive from the HLC the current date and time within a predetermined interval after power-up, then the Modem Agent will enter alert mode and initiate contact with the host monitoring Server. When the Modem Agent contacts the host monitoring server, it will verify the time last set by the Agent Configuration Utility.

c. prevent modem contention

The Modem Agent does not interfere with the use of the modem by PC applications. Before calling the host monitoring server, the Modem Agent ensures that the modem is not currently in use. If a PC application starts to use the modem, as indicated by the receipt of AT commands by the modem, then the Modem Agent immediately drops any active call and immediately relinquishes control of the modem to the PC.

d. active alert mode

The Modem Agent will enter alert mode when it has not received communications with the Agent Configuration Utility of configuration application within X minutes. The Modem Agent will then immediately attempt to contact the monitoring server and will continue to contact it every Y minutes until communications from the Agent Configuration Utility are received (set absolute time AT command). This mode is to prevent thieves from removing the hard disk or reformatting the hard disk to defeat the Agent tracing service.

CPU Agent

Figure 13A:
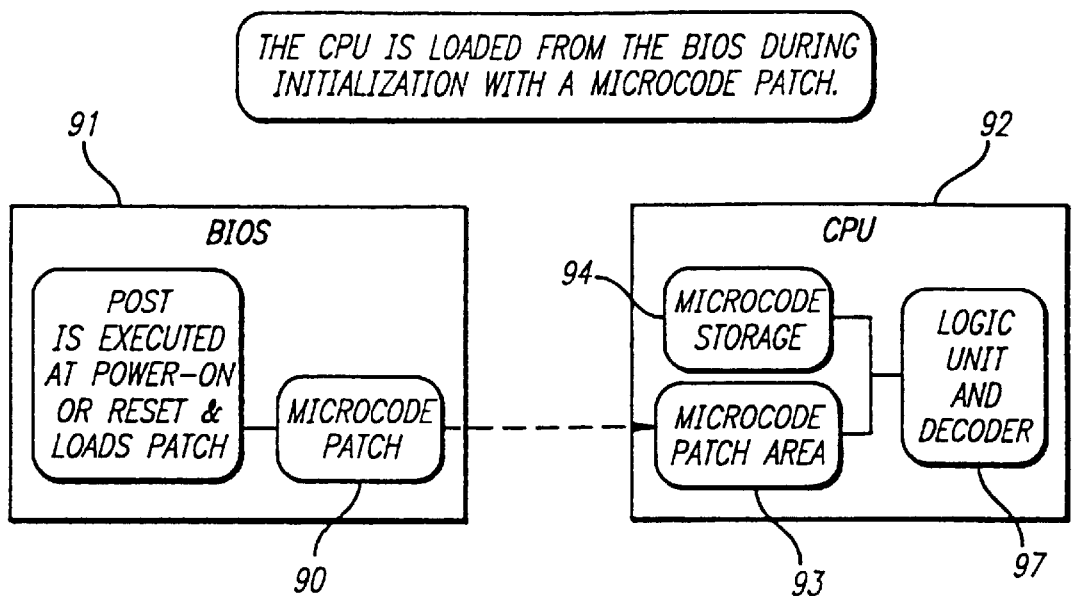
FIGS. 13A and B are schematic diagrams illustrating the embodiment in which the Agent resides in the CPU.
Figure 13B:
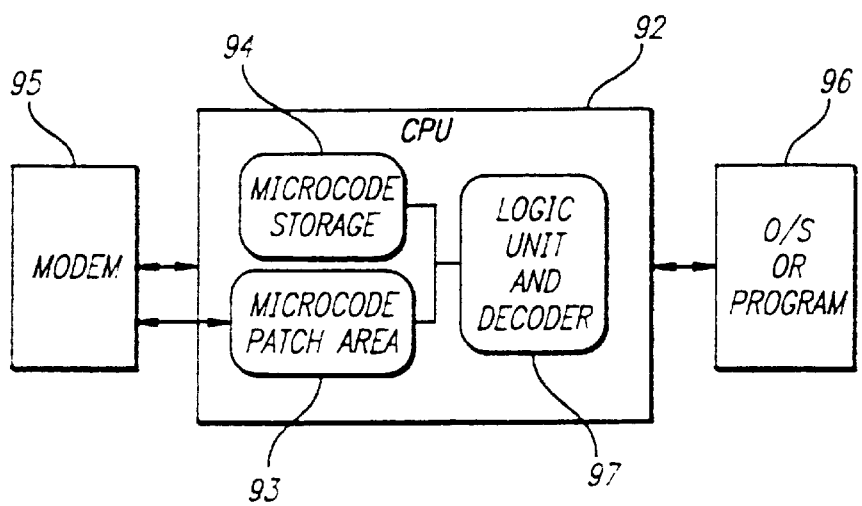

The Agent may be implemented in a CPU using an existing technology in many current microprocessors which allows patching of the microcode. The microcode is the architectural layer of the CPU which translates an external macrocode algorithm stored in volatile or non-volatile memory into a microprocessor's internal execution codes. Referring to FIG. 13A, the A microcode patch 90 is formatted and encrypted according to each specific chip manufacturer's specifications. It is uploaded from the BIOS 91 to a microcode patch area 93 and/or microcode storage 94 in the CPU 92, after reset, during the POST initialization of the computer. The microcode patch 90 can implement all the functions of the conventional algorithmic Agent. Referring also to FIG. 13B, the Agent may take a similar form as the BIOS Agent or the SPC of Segmented Agent described before. The SPC in the microcode patch initiates communication with the modem 95 asynchronously of the normal code stream (i.e., of the operating system or application program 96) via the logic unit and decoder 97 of the CPU 92.

Examples of microprocessors which allows for microcode patching are the Pentium Pro and Pentium II processors developed by Intel Corporation. Of course it is also possible to implement the Agent in microcode or in logic circuitry inside the CPU during the manufacturing process in addition to the patching facility or exclusive of the patching facility of the CPU.

The CPU Agent may be configured to communicate with the host monitoring server via modem call and/or internet.

Hardware Agent

The Agent may be implemented in hard wired circuitry or a single integrated circuit using existing technology which takes an engineer's logic specification and translates into the data which is used to program, build, or design the hardware device or circuit. The hardware device or circuit would then execute according to the engineer's logic specification and perform the functions of the Agent by establishing a communications link and sending and receiving data packets in order to establish both the identification and location of the electronic device within which the hardware device or circuit is included, thereby simulating the algorithmic function of the Agent.

Host Identification and Filtering System

Figure 9:
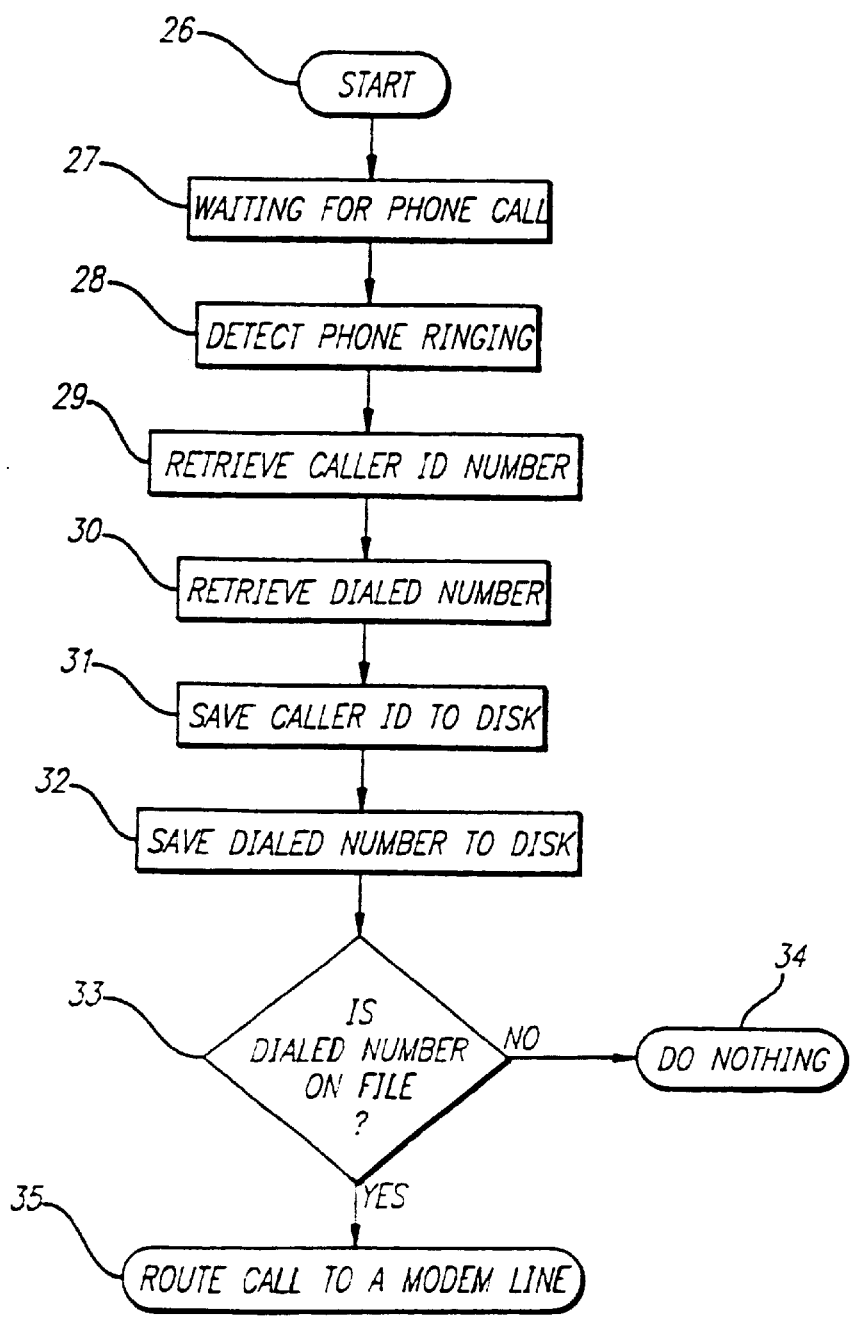
FIG. 9 is an illustrative embodiment in the form of a flowchart of a process by which the host identification and filtering subsystem identifies and filters out unwanted calls from Agents.

The Host Identification and Filtering System identifies and filters out unwanted calls from agents. FIG. 9 is a flow diagram of the host identification and filtering program executed by host computer 3. Once the security program is executed 26, the voice board waits 27 for the ring signal on the telephone line 1. When a ring signal is detected 28, the voice board 2 acknowledges the incoming call by sending a signal to the telephone company 9B via telephone line 1 requesting that the caller ID and the dialed numbers be sent to it. The voice board then waits until these numbers are received 29, 30.

Once the caller ID and the dialed numbers have been received, they are saved to the hard disk 31, 32. The security program then compares the dialed numbers 33, which provide an encoded version of the serial number of the client computer 10 (coding scheme explained in detail below), against a list of serial numbers stored on the hard disk 4. If no match is found, the program lets the phone ring until the client computer 10 hangs up the telephone line 34. In the preferred embodiment, the client computer is programmed to hang up after 30 seconds of unanswered ringing. However, if a match is found, the security program routes the call to an appropriate receiving line connected to a modem 35, which answers the call. In an alternative embodiment, the host 3 answer all calls and the serial number of the client computer 10 is provided in a separate subsequent call from the client computer 10.

Encoding of the client computer serial number

Figure 10A:
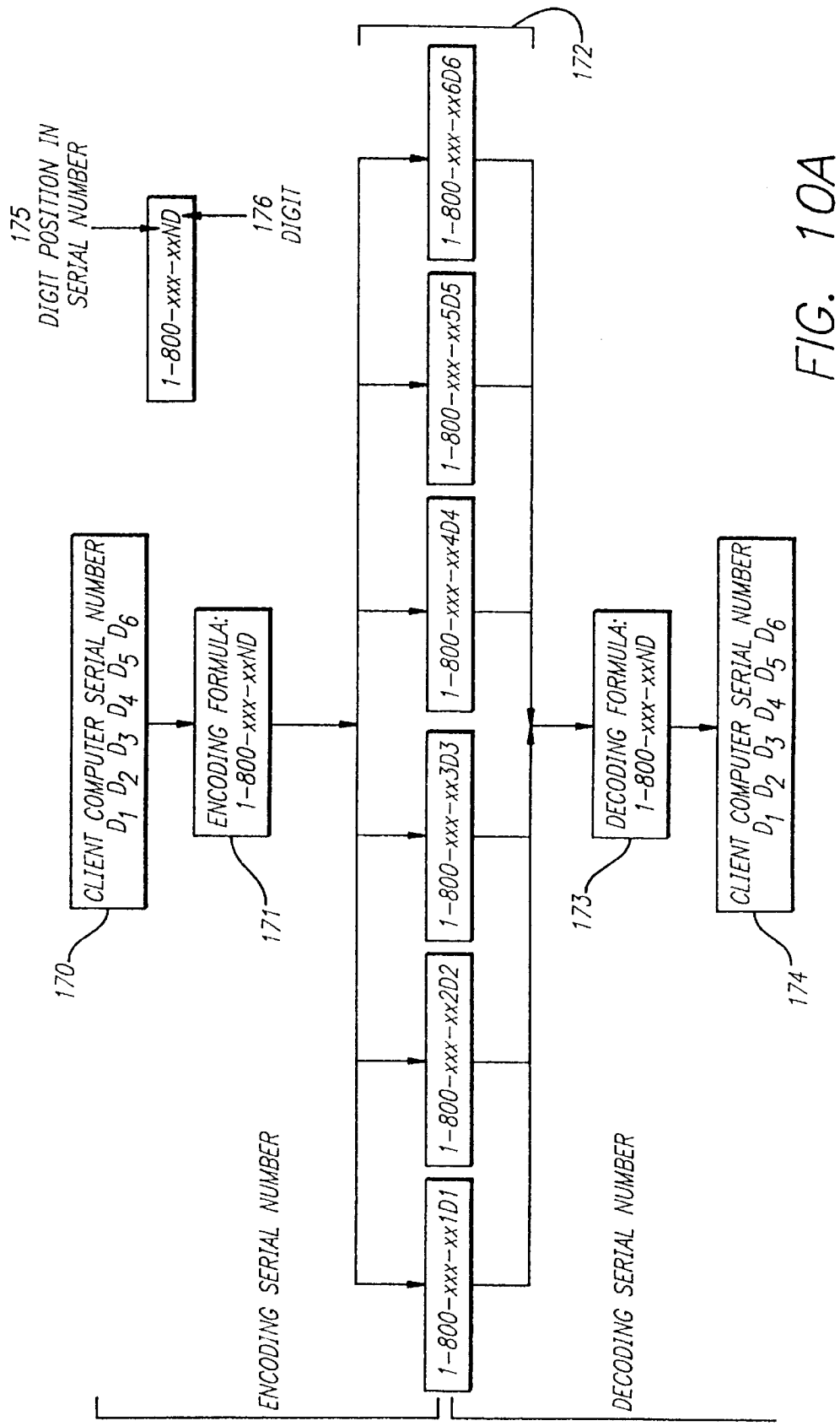
FIG. 10A is a schematic showing an illustrative embodiment of the encoding/decoding method whereby the monitoring service would have to subscribe to 60 telephone numbers.

Referring to FIG. 10A in one embodiment of the invention, the serial number of client computer 10 is encoded within the dialed numbers it sends to the host 3. In the preferred encoding methodology, the client computer transmits its six digit serial number 170 to the host via a series of six complete dialed phone numbers 172. The first eight dialed digits after the first "1" are meaningless. The ninth dialed digit "N" 175, indicates which digit position within the serial number that the tenth dialed number corresponds to. The tenth dialed digit "D" provides the Nth digit of the serial number. The host computer 3 receives the six complete dialed phone numbers 172 and decodes them 173 by looking at only the ninth and tenth dialed digits. The client computer serial number 174 is thus reproduced.

For example, in the sequence "800-996-5511", the only relevant digits are the "11" portion. The first "1" indicates that the digit immediate to its right (1) is the first digit in the serial number. Similarly, in the sequence "800-996-5526", the "2" indicates that the number immediate to its right (6) is the second number in the serial number: The client computer, in total, dials six numbers 172 in order to convey its six-digit serial number to the host.

In order to accommodate this method of serial number coding, the host monitoring system needs to subscribe to sixty different phone numbers. All sixty numbers should have the same first eight digits, and only vary from one another with respect to the last two digits. The ninth digit need only vary from "1" through "6" corresponding to the six digits within a serial code. However, the last digit must vary from "0" to "9".

Figure 10B:
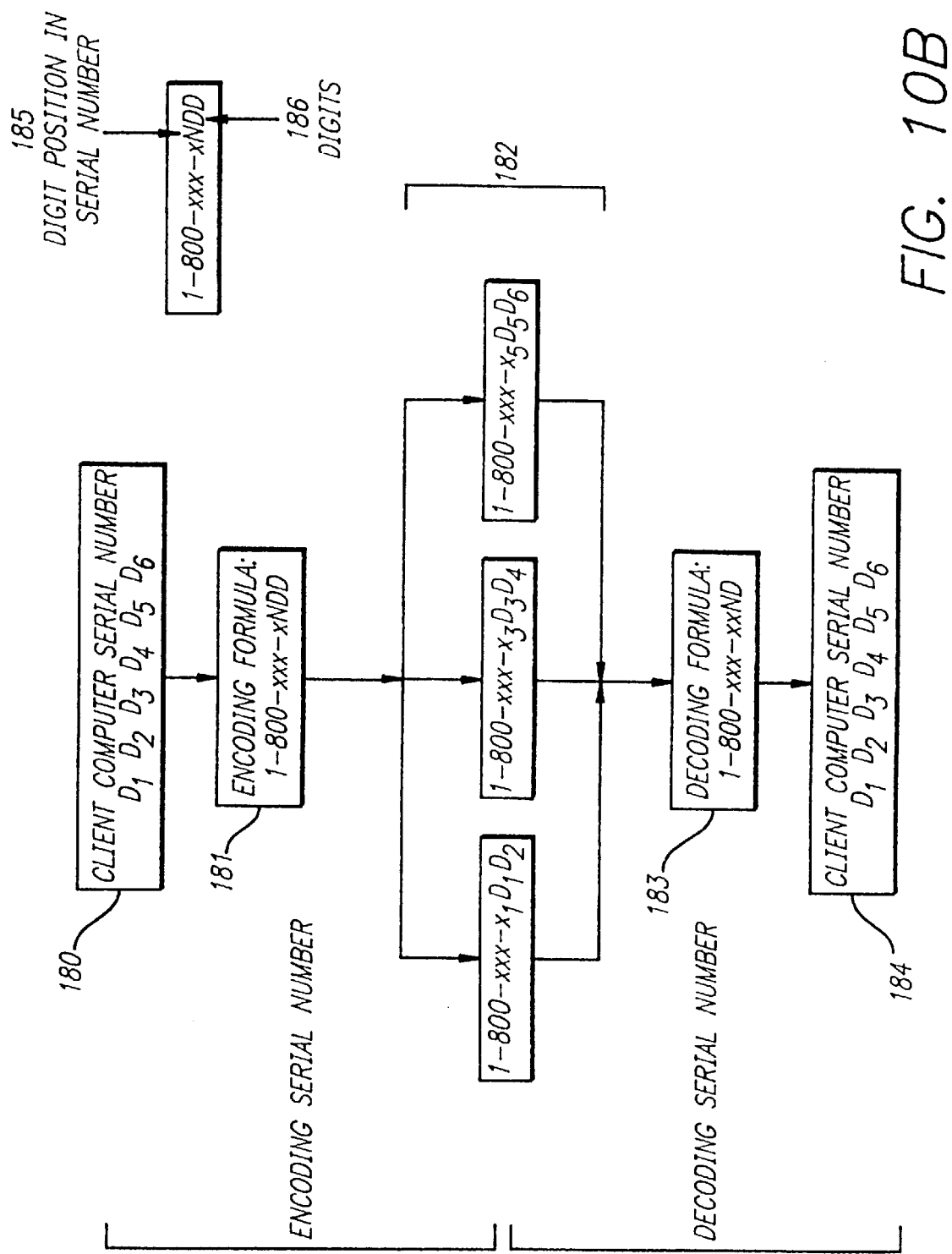
FIG. 10B is a schematic showing an illustrative embodiment of the encoding/decoding method whereby the monitoring service would have to subscribe to 300 telephone numbers.

Referring to FIG. 10B, the encoding methodology can alternatively be modified such that the client computer need only call the host three times to convey its serial number 180. According to this coding method, two digits of the serial number 186 would be transmitted in each call. Thus, the eighth dialed digit 185 would vary from "1" to "3", corresponding to the three packets of two digits 186 that make up the serial number 180. The ninth and tenth dialed digits 186 would vary from "0" through "9". However, this would require the operator of the monitoring system to subscribe to three hundred different phone numbers.

Host Processing, Auditing and Communication Subsystem

Figure 11A:
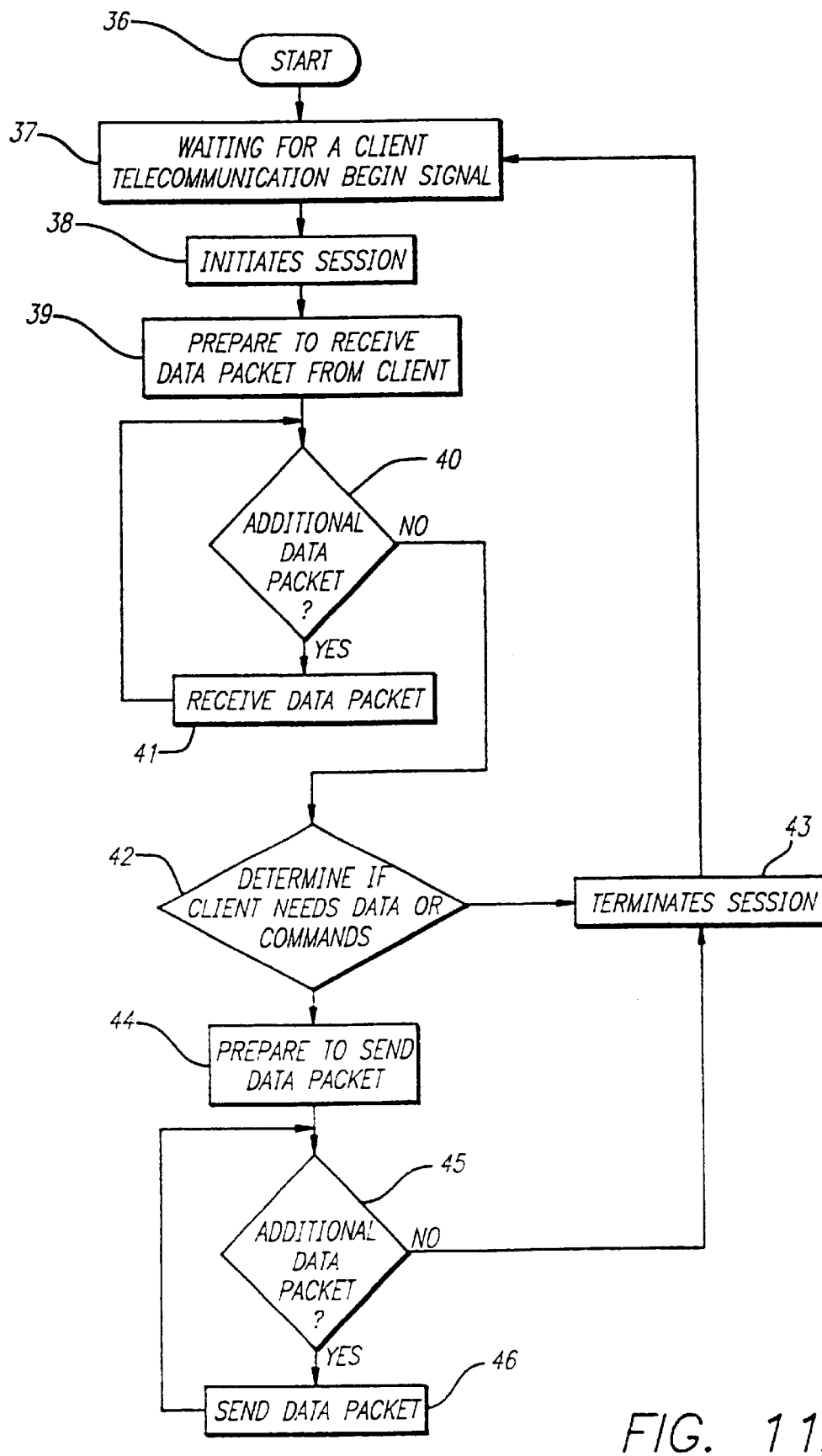
FIG. 11A is an illustrative embodiment in the form of a flowchart of a process by which the host telephone monitoring subsystem exchanges data with an Agent.

The host processing, auditing and communication subsystem receives and transmits information to and from clients. FIG. 11A is a flow diagram of the host communication program executed by host computer 3. After the host computer 3 is powered on 36, communication equipment is instructed to wait 37 for the telecommunication begin signal from the client computer 10. The telecommunication equipment acknowledges the begin signal by initiating a session to communicate with the client computer 38 and preparing the host to receive data packets from the client 39. The program first establishes that the client computer is sending data packets and that it has received all of the packets 40, 41. Next, the program determines if the client has any data or commands to be sent to the host 42. If not, the session is terminated 43, and the cycle is repeated 37. When all data packets have been received, the program permits the host to send data packets to the client computer. The program prepares to send data packets 44, and then establishes that there are more data packets to be sent 45 before sending each packet 46. Once all data packets have been sent, the program terminates the session 43, hangs up the phone, and prepares to repeat the entire cycle 37. Host-side source codes are disclosed in the copending patent application Ser. Nos. 08/826,098 and 08/558,432 which had been incorporated by reference here.

Figure 11B:
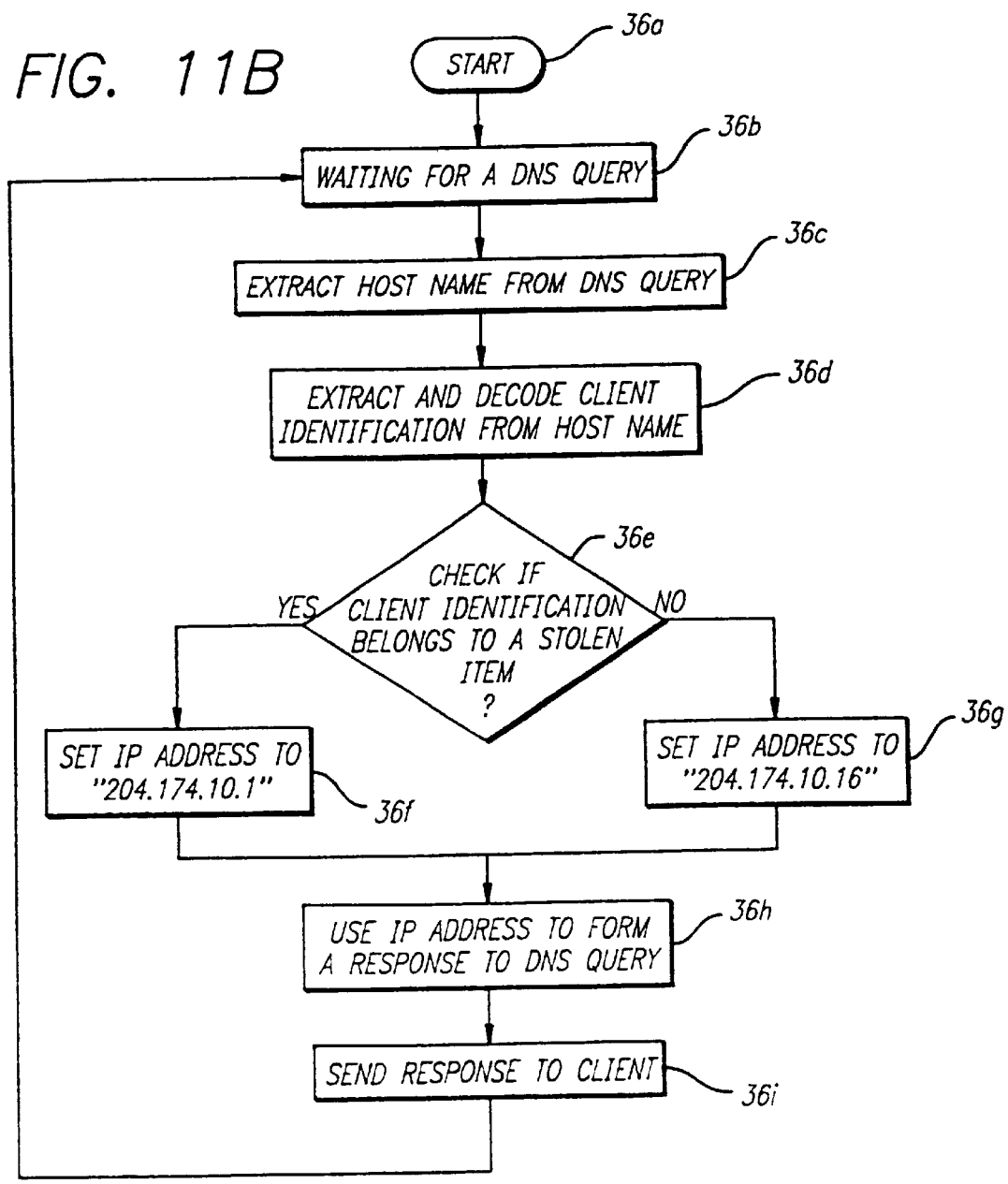
FIG. 11B is an illustrative embodiment in the form of a flowchart of a process by which the host Internet monitoring subsystem exchanges data with an Agent.
Figure 11B:
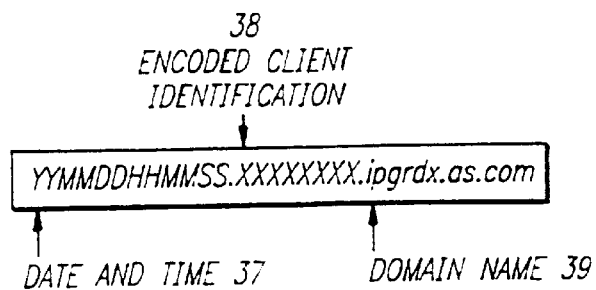

Referring to FIG. 11B, the host processing, auditing and communication subsystem for the Internet application receives and transmits information to and from clients over the Internet. FIG. 11B is a flow diagram of the host communication program executed by host computer 3 in connection with the Internet application. After the host computer is powered on 36a, TCP/IP support is loaded and the computer waits for a DNS query from the client computer 36b. The host name is then extracted from the DNS query 36c. Next, the DNS request is decoded to determine the client computer identification 36d. A check is made to determine whether the computer has been stolen 36e. This is accomplished by comparing the identification number of the client computer with a list of reported lost or stolen computers which is stored by the host computer. If it has been stolen a suitable message 36f is returned to the client computer 10. In the preferred embodiment, the message is provided by setting the IP address of the next transmission to the client computer to "204.174.10.1" 36f. If the client computer is not stolen, an alternate message is returned 36g. In the preferred embodiment this is achieved by setting the IP address to "207.174.10.16" 36g. The host uses either of these two IP addresses to form a response to the DNS query received from the client computer 36h. The host then sends its response to the client computer 36i. The host also records the transaction on the hard disk. The host then prepares to repeat the entire cycle 36b.

Referring to FIG. 11C, the manner in which client identification is encoded is illustrated. FIG. 11C shows the various components of a host name which is used to form a DNS request. The host name, according to one embodiment of the invention, is a string of characters including the date and time 37, encoded client identification 38, and domain name 39. The encoded client identification 38 is extracted from the host name for decoding at the host Internet subsystem 9y.

Host Notification Subsystem

Figure 12:
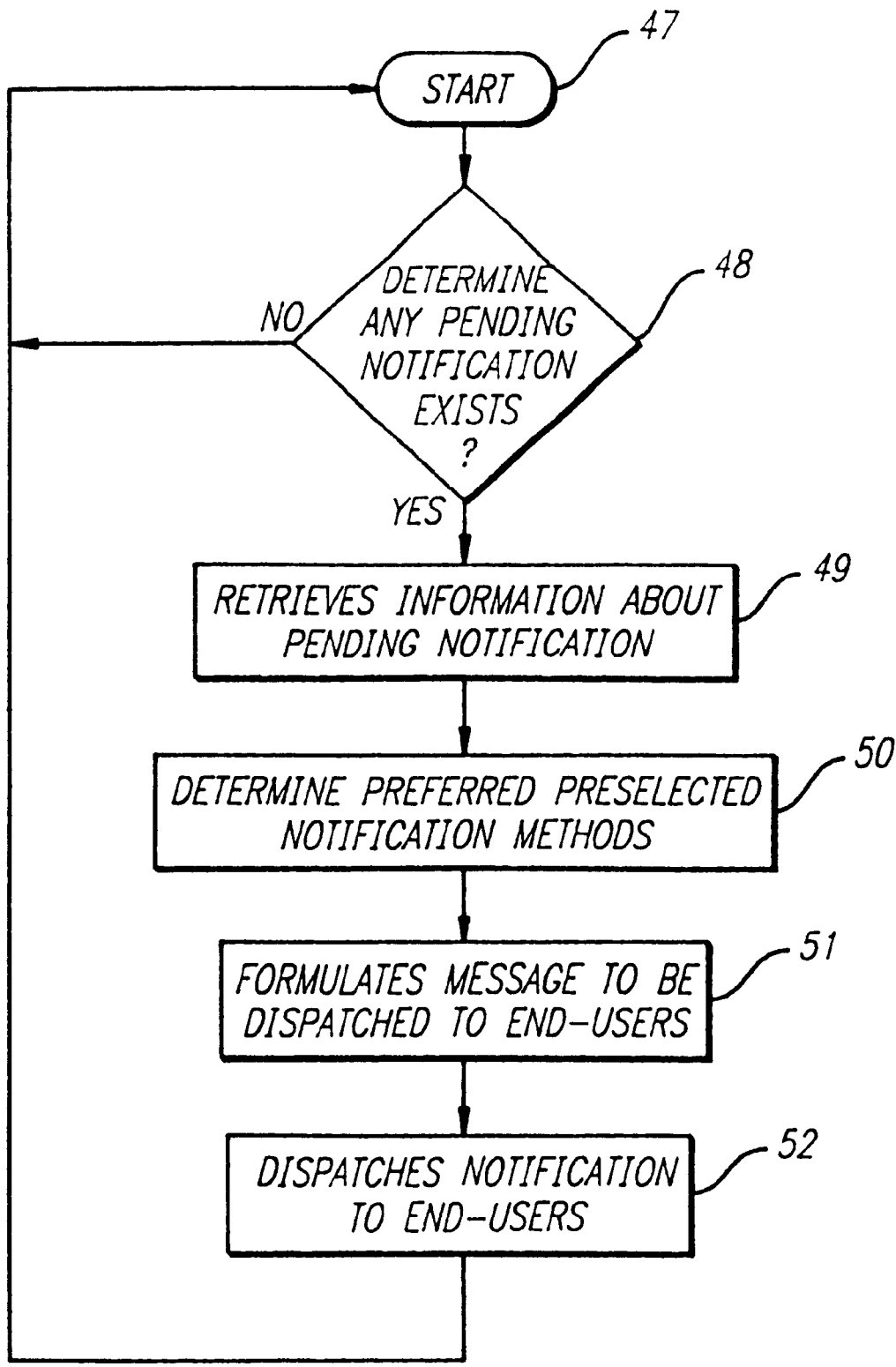
FIG. 12 is an illustrative embodiment in the form of a flowchart of the process by which the host notification subsystem, contained within the host computer, notifies end-users of the status of monitored devices.

The host notification subsystem notifies the end-users regarding the status of their electronic devices. In FIG. 1, various methods of notification such as; electronic mail N1, fax N2, paging N4, and telephone call N3, are depicted. FIG. 12 is a flow diagram of the host notification program executed by host computer 3. The host notification program determines whether there are any pending notification instructions or commands 48. If there are pending notifications, the information is retrieved 49. The program then determines the preferred preselected notification method 50, and formulates the message to be dispatched 51 according to the preselected notification method. This message is dispatched to the end-user 52. After dispatching the message, the program repeats the entire cycle 47. Host-side source codes are disclosed in the copending patent application Ser. Nos. 08/826,098 and 08/558,432 which had been incorporated by reference herein.

Variations and Alternatives

The above description relates to the Agent security system installed and operating in a conventional PC with an Intel 80X86 microprocessor or equivalent and with a conventional MS-DOS or PC-DOS operating system. It will be recognized that the system can be modified to fit other types of computers including, for example, those sold under the trademark Macintosh. The system can easily be modified to suit other types of operating systems or computers as they develop.

The above system is also intended to be added to existing computers without physical alteration. Another approach is to modify the ROM of such computers to contain the Agent security system. The Agent security system also may be incorporated into the ROM of portable computers, cellular telephones or other electronic devices when they are manufactured.

One embodiment of the invention uses a modem connected or built-in to a computer. In the future it is likely that telephone systems will be digitized, thus obviating the need for a modem. The scope of this invention contemplates such digitized systems.

The system could also be included in the ROM of a cellular telephone. In this case, the program would hide the outgoing calls from the user by silencing audio signals and maintaining a normal screen display. It is also conceivable that portable computers can be supplied with integral cellular telephones modified in this manner or with some other telecommunication device.

The main telecommunication criteria for this Agent security system is that the outgoing transmission (wire, radio signal or otherwise) be received by a switching mechanism, and contain information that causes the switching mechanism to forward the information received to a remote station. Presently, this information is a telephone number and/or a DNS query. But other indicia of the remote station may be substituted in alternative switchable communications systems without departing from the scope of this invention.

This application contemplates sending and receiving signals from a client computer to a host system through a global network system. The Internet has been described in this application as merely one application of the invention. It is contemplated that this invention can and will be applied to other global network systems. Thus, the specific disclosure addressed to the Internet should not be construed as a limitation as to the scope of the invention, but rather should be considered to be merely one embodiment of the invention.

It will be understood by someone skilled in the art that many of the details described above are by way of example only and are not intended to limit the scope of the invention which is to be interpreted with reference to the claims which follow.

We claim:

1. A method for tracing an electronic device comprising the steps of:
   providing an Agent within the electron device, the Agent configured to transmit identifying indicia for the electronic device and/or its device components to a host system at a predetermined schedule without further intervention by the electronic device or user upon activation;
   activating the Agent;
   at the predetermined schedule, the Agent establishing a communication link between the electronic device and the host system and transmitting the identifying indicia to the host system without intervention by the electronic device or user;
   enabling the host system to determine the location of the electronic device based on tracing of the communication link.

2. The method of claim 1 wherein the Agent is encoded in one or more forms, including software, firmware and hardware.

3. The method of claim 2 wherein the Agent is encoded in one or more device components in the electronic device, including internal non-volatile memory device, communication device, processor, digital signal processor, integrated circuit and hardware circuit.

4. The method of claim 2 wherein the Agent is encoded in one or more internal non-volatile memory devices in the electronic device, including ROM, BIOS, ROM, EPROM, EEPROM and Flash ROM.

5. The method of claim 3 wherein the communication device is a modem.

6. The method of claim 5 wherein the Agent establishes communication with the host system by using a command function which initializes the communication and a call management function which interfaces with the host system.

7. The method of claim 3 wherein the Agent establishes communication with the host system independent of normal operations of the electronic device.

8. The method of claim 3 wherein the Agent is activated upon startup of the electronic device prior to activating the electronic device in respect of its normal system operations.

9. The method of claim 8 wherein the Agent is activated by loading into an internal volatile memory and running the Agent prior to activating normal system operations of the electronic device.

10. The method of claim 9 further comprising the steps of checking whether the Agent is also found on a hard disk within the electronic device and copying the Agent to the hard disk prior to loading and running the Agent.

11. The method of claim 3 wherein a first component of the Agent is provided in a first device component and a second component of the Agent is provided in a second device component.

12. The method of claim 11 wherein the first component of the Agent includes a secure protocol component of the Agent which communicates with the electronic device's operating system.

13. The method of claim 12 wherein the Agent immediately establishes the communication link with the host system to transmit the identifying indicia of the electronic device and/or its device components if the secure protocol component fails to establish communication with the operating system.

14. The method of claim 11 wherein the second device component includes a hard disk drive.

15. A method as in claim 1 wherein the communication link is a global network.

16. A method as in claim 15 wherein the global network is Internet network.

17. A method as in claim 16 where said step of transmitting the identifying indicia comprises the step of sending a DNS query with said identifying indicia encoded therein.

18. The method as in claim 16 wherein said step of enabling the host system to determine the location of the electronic device comprises the step of conducting a traceroute routine to identify to the host system those Internet communication links connecting the electronic device to the host system.

19. The method as in claim 18 wherein the traceroute routine is conducted upon request from the host system which determined that tracing of the electronic device would be desirable.

20. A method for tracing a computer comprising the steps of:
   providing an Agent within the computer, the Agent configured to transmit identifying indicia for the computer or its device components to a host system at a predetermined time without further intervention by the computer or user upon activation;
   activating the Agent;
   at the predetermined time, the Agent establishing a communication link between the computer and the host system and transmitting the identifying indicia to the host system without intervention by the computer or user;
   enabling the host system to determine the location of the computer based on tracing of the communication link.

21. The method of claim 20 wherein the Agent is encoded in one or more forms, including software, firmware and hardware.

22. The method of claim 21 wherein the Agent is encoded in one or more device components in the computer, including internal non-volatile memory device, communication device, processor, digital signal processor, integrated circuit and hardware circuit.

23. The method of claim 23 wherein said device components further include ROM BIOS, central processing unit and modem.

24. The method of claim 23 wherein the Agent is activated independent of the computer's operating system.

25. The method of claim 24 wherein the Agent is activated prior to loading the operating system.

26. An apparatus for tracing an electronic device comprising:

an agent imbedded within the electronic device, the Agent configured to establish a communication link between the electronic device and a host system and transmit identifying indicia for the electronic device and/or its device components to the host system at a predetermined schedule without further intervention by the electronic device or user upon activation;

means for activating the Agent;

means for enabling the host system to determine the location of the electronic device based on tracing of the communication link.

27. The apparatus of claim 26 wherein the Agent is encoded in one or more forms, including software, firmware and hardware.

28. The apparatus of claim 27 wherein the Agent is encoded in one or more device components in the electronic device, including internal non-volatile memory device, communication device, processor, digital signal processor, integrated circuit and hardware circuit.

29. The apparatus of claim 27 wherein the Agent is encoded in one or more internal non-volatile memory devices in the electronic device, including ROM, BIOS, ROM, EPROM, EEPROM and Flash ROM.

30. The apparatus of claim 29 wherein the communication device is a modem.

31. The apparatus of claim 30 wherein the Agent comprises a command function which initializes communication with the host system and a call management function which interfaces with the host system.

32. The apparatus of claim 28 wherein the Agent is configured to establish communication with the host system independent of normal operations of the electronic device.

33. The apparatus of claim 28 wherein the Agent is configured to be activated upon startup of the electronic device prior to activating the electronic device in respect of its normal system operations.

34. The apparatus of claim 33 wherein the Agent is configured to be loaded into an internal volatile memory and executed prior to activating normal system operations of the electronic device.

35. The apparatus of claim 34 wherein the Agent is further configured to check whether the Agent is also found on a hard disk within the electronic device and copying the Agent to the hard disk prior to loading and running the Agent.

36. The apparatus of claim 28 wherein a first component of the Agent is provided in a first device component and a second component of the Agent is provided in a second device component.

37. The apparatus of claim 36 wherein the first component of the Agent includes a secure protocol component of the Agent which communicates with the electronic device's operating system.

38. The apparatus of claim 37 wherein the Agent is configured to immediately establish the communication link with the host system to transmit the identifying indicia if the secure protocol component fails to establish communication with the operating system.

39. The apparatus of claim 36 wherein the second internal memory device is a hard disk drive.

40. An apparatus for tracing a computer comprising:

an Agent imbedded within the computer, the Agent configured to establish a communication link between the computer and a host system and transmit identifying indicia for the computer and/or its device components to a host system at a predetermined time without further intervention by the computer or user upon activation;

means for activating the Agent;

means for enabling the host system to determine the location of the computer based on tracing of the communication link.

41. The apparatus of claim 40 wherein the Agent is configured to establish communication with the host system independent of normal operations of the computer.

42. The apparatus of claim 41 wherein the Agent is configured to be activated independent of the computer's operating system.

43. The apparatus of claim 42 wherein the Agent is configured to be activated prior to loading the operating system.

44. The apparatus of claim 40 wherein the Agent is encoded in one or more forms, including software, firmware and hardware.

45. The apparatus of claim 44 wherein the Agent is encoded in one or more device components in the electronic device, including internal non-volatile memory device, communication device, processor, digital signal processor, integrated circuit and hardware circuit.

46. An electronic device comprising:

an agent imbedded within the electronic device, the Agent configured to establish a communication link between the electronic device and a host system and transmit identifying indicia for the electronic device and/or its device components to the host system at a predetermined schedule without further intervention by the electronic device or user upon activation;

means for activating the Agent;

means for enabling the host system to determine the location of the electronic device based on tracing the communication link.

47. A computer comprising:

processing means operable with an operating system;

a storage device storing application programs and data;

an input and output interface;

means for communicating with a host computer;

an Agent imbedded within the computer, the Agent configured to establish a communication link between the computer and a host system via said communicating means and transmit identifying indicia for the computer and/or its device components to the host system at a predetermined time without further intervention by the electronic device or user upon activation;

means for activating the Agent;

means for enabling the host system to determine the location of the computer based on tracing of the communication link.

* * * * *

UNITED STATES PATENT AND TRADEMARK OFFICE
CERTIFICATE OF CORRECTION

PATENT NO.    : 6,269,392 B1
DATED         : July 31, 2001
INVENTOR(S)   : Cotichini et al.

It is certified that error appears in the above-identified patent and that said Letters Patent is hereby corrected as shown below:

<u>Column 23,</u>
Line 40, "electron" should read -- electronic --.

Signed and Sealed this

Twelfth Day of August, 2003

JAMES E. ROGAN
*Director of the United States Patent and Trademark Office*